United States Patent
Jee et al.

(10) Patent No.: US 12,486,420 B2
(45) Date of Patent: Dec. 2, 2025

(54) INK COMPOSITION, LUMINESCENT NANOSTRUCTURE COMPOSITE, COLOR CONVERSION PANEL, AND DISPLAY DEVICE INCLUDING THE SAME

(71) Applicant: SAMSUNG ELECTRONICS CO., LTD., Suwon-si (KR)

(72) Inventors: Sang Soo Jee, Hwaseong-si (KR); Shang Hyeun Park, Yongin-si (KR); Shin Ae Jun, Seongnam-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 732 days.

(21) Appl. No.: 17/678,246

(22) Filed: Feb. 23, 2022

(65) Prior Publication Data

US 2022/0267632 A1 Aug. 25, 2022

(30) Foreign Application Priority Data

Feb. 23, 2021 (KR) .................. 10-2021-0024431

(51) Int. Cl.
*C09D 11/50* (2014.01)
*B41M 5/00* (2006.01)
(Continued)

(52) U.S. Cl.
CPC ........... *C09D 11/50* (2013.01); *B41M 5/0023* (2013.01); *C09D 11/033* (2013.01);
(Continued)

(58) Field of Classification Search
CPC ..... C09D 11/50; C09D 11/033; C09D 11/037; C09D 11/107; C09D 11/322;
(Continued)

(56) References Cited

U.S. PATENT DOCUMENTS 10,663,860 B2   5/2020   Kwon et al.
10,738,177 B2   8/2020   Lee et al.
(Continued)

FOREIGN PATENT DOCUMENTS

KR   1020180096536 A   8/2018
KR     20190080638 A   7/2019
KR   1020200030542 A   3/2020

OTHER PUBLICATIONS

Korean Office Action for Korean Patent Application No. 10-2021-0024431 dated Feb. 27, 2023.

*Primary Examiner* — Catherine S Branch
*Assistant Examiner* — Andrea Wu
(74) *Attorney, Agent, or Firm* — CANTOR COLBURN LLP

(57) ABSTRACT

An ink composition and luminescent nanostructure composite, and an electronic device including the luminescent nanostructure composite. The ink composition includes a plurality of titanium oxide particles, a plurality of luminescent nanostructures (e.g., quantum dots), a monomer including a carbon-carbon unsaturated bond, and optionally an organic solvent. The titanium oxide particles have an average size of greater than or equal to about 10 nm and less than or equal to about 900 nm, and the titanium oxide particles comprise an organosilane compound. The ink composition has a total solid content (TSC) of greater than or equal to about 90 wt %, and an amount of the titanium oxide particles in the ink composition is greater than or equal to about 1 wt % based on the total weight of the ink composition. The ink composition is configured to emit a first light.

22 Claims, 9 Drawing Sheets

(51) Int. Cl.
  *C09D 11/033* (2014.01)
  *C09D 11/037* (2014.01)
  *C09D 11/107* (2014.01)
  *C09D 11/322* (2014.01)
  *C09K 11/08* (2006.01)
  *C09K 11/88* (2006.01)
  *G02F 1/1339* (2006.01)
  *H10K 59/38* (2023.01)

(52) U.S. Cl.
  CPC .......... *C09D 11/037* (2013.01); *C09D 11/107* (2013.01); *C09D 11/322* (2013.01); *C09K 11/0883* (2013.01); *C09K 11/883* (2013.01); *G02F 1/13394* (2013.01); *H10K 59/38* (2023.02); *G02F 2202/36* (2013.01)

(58) Field of Classification Search
  CPC ............. B41M 5/0023; C09K 11/0883; C09K 11/883; G02F 1/13394; G02F 2202/36; H10K 59/38
  See application file for complete search history.

(56) References Cited

U.S. PATENT DOCUMENTS

| | | |
|---|---|---|
| 11,618,833 B2 | 4/2023 | Yoshihara et al. |
| 2004/0024091 A1* | 2/2004 | Yamada ................. C09D 11/36 523/160 |
| 2015/0159036 A1 | 6/2015 | Murugesan et al. |
| 2018/0239247 A1 | 8/2018 | Kwon et al. |
| 2020/0224047 A1 | 7/2020 | Yoshihara et al. |
| 2020/0241361 A1 | 7/2020 | Mukaigaito et al. |

\* cited by examiner

INK COMPOSITION, LUMINESCENT NANOSTRUCTURE COMPOSITE, COLOR CONVERSION PANEL, AND DISPLAY DEVICE INCLUDING THE SAME

CROSS-REFERENCE TO RELATED APPLICATION

This application claims priority to Korean Patent Application No. 10-2021-0024431 filed in the Korean Intellectual Property Office on Feb. 23, 2021, and all the benefits accruing therefrom under 35 U.S.C. § 119, the content of which in its entirety is incorporated herein by reference.

BACKGROUND

1. Field

An ink composition, a luminescent nanostructure, a method for producing the ink composition, a luminescent nanostructure composite (produced therefrom), and an electronic device (e.g., a color conversion panel and a display device) including the luminescent composite are disclosed.

2. Description of the Related Art

Luminescent nanostructures (quantum dots, i.e., nano-sized semiconductor nanocrystals), unlike bulk materials, may have different energy bandgaps by controlling the size and composition of the nanocrystals. The luminescent nanostructures may exhibit electroluminescent and photoluminescent properties. The luminescent properties of the luminescent nanostructures may be applied to various electronic devices (e.g., display devices), for which the luminescent nanostructures or a composite including the luminescent nanostructure may have the form of a film or a pattern. It is desirable to develop an ink composition capable of more conveniently forming such a film or pattern including luminescent nanostructures.

SUMMARY

An embodiment provides an ink composition including a luminescent nanostructure.

An embodiment provides a method for producing the ink composition.

An embodiment provides a luminescent nanostructure composite formed from the ink composition.

An embodiment provides a color conversion panel or a display panel including the luminescent nanostructure composite.

An embodiment provides an electronic device (e.g., a display device) including the color conversion panel.

In an embodiment, an ink composition includes a plurality of titanium oxide particles, a plurality of luminescent nanostructures (e.g., quantum dots), a monomer comprising a carbon-carbon unsaturated bond, and optionally, an organic solvent, wherein the plurality of titanium oxide particles has an average size of greater than or equal to about 10 nanometers (nm) and less than or equal to about 900 nm, the plurality of titanium oxide particles includes an organosilane compound, the ink composition has a total solid content (TSC) of greater than or equal to about 90 weight percent (wt %), based on a total weight of the ink composition, and an amount of the titanium oxide particles is greater than or equal to about 1 wt %, based on the total solid content of the ink composition, and the ink composition is configured to emit a first light.

The titanium oxide particles may be non-luminescent. The titanium oxide particles may have an average size of greater than or equal to about 50 nm. The titanium oxide particles may have an average size of less than or equal to about 200 nm.

The ink composition may have a total solid content of greater than or equal to about 95 wt %.

The titanium oxide may exhibit a positive (+) zeta potential (for example, as dispersed in propylene glycol monomethyl ether acetate (PGMEA) or tetrahydrofuran (THF)).

The titanium oxide particles may further include aluminum. In the titanium oxide particles, or in the ink composition, an amount of aluminum may be greater than or equal to about 0.1 wt %, or greater than or equal to about 0.5 wt % based on the total weight of the titanium oxide.

In the titanium oxide particles, or in the ink composition, an amount of aluminum may be less than or equal to about 10 wt %, less than or equal to about 5 wt %, or less than or equal to about 3 wt %, based on the total weight of the titanium oxide.

In the titanium oxide particles, or in the ink composition, an amount of the organosilane compound may be greater than or equal to about 0.1 wt %, or greater than or equal to about 0.5 wt %, based on the total weight of the titanium oxide particles.

In the titanium oxide particles or in the ink composition, an amount of the organosilane compound may be less than or equal to about 10 wt %, less than or equal to about 5 wt %, or less than or equal to about 3 wt % based on the total weight of the titanium oxide particles.

The organosilane compound may be a PEG silane compound. The PEG silane compound may be a silane compound having a plurality of (e.g., greater than two, three, four and less than or equal to about 100, 50, 30, or 20) ethylene glycol repeating units.

The organosilane compound may have a moiety represented by Chemical Formula 1-1:

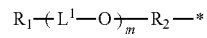

$$R_1\text{---}(L^1\text{---}O)_{\overline{m}}R_2\text{---}*$$

Chemical Formula 1-1 wherein, $R_1$ is hydrogen, a substituted or unsubstituted C1 to C30 alkyl group, a substituted or unsubstituted C1 to C30 alkyl ester moiety, a substituted or unsubstituted C1 to C10 alkoxy group, a hydroxy group, a carboxyl group, a (meth)acrylate group, an amine group, a maleimide group, a thiol group, an azide group, or a C1 to C10 fluorinated alkoxy group, $L^1$ is a direct bond, a substituted or unsubstituted C2 to C5 (or C1 to C10) alkylene group, a substituted or unsubstituted C2 to C5 (or C1 to C10) fluorinated alkyl group, or a combination thereof $R_2$ is a direct bond, a substituted or unsubstituted C1 to C20 alkylene group, sulfonyl (—$SO_2$—), carbonyl (CO), ether (—O—), sulfide (—S—), sulfoxide (—SO—), ester (—C(=O)O—), —NR—, amide (—C(=O)NR—), or a combination thereof, wherein R is hydrogen or a C1 to C10 alkyl group,

* is a part linked to a Si atom of the organosilane compound, and m is 1 to 100 or 1 to 40 or 2 to 40.

The organosilane compound may include a compound represented by Chemical Formula 1:

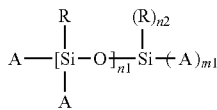

Chemical Formula 1 n1 is an integer of 0 to 10, n2 is an integer of 1 to 3, m1 is 0 or an integer of 1 to 2, n2+m1 is 3, and each A is the same or different, and each independently a hydroxyl group, a substituted or unsubstituted C1 to C10 alkoxy group, chlorine, —O* (wherein * of —O* represents a part to be linked (e.g., a connection) to a surface of the luminescent nanostructure), or a combination thereof.

R is the same or different, and each independently a C1 to C40 (or C3 to C24) substituted or unsubstituted aliphatic hydrocarbon group, a C6 to C40 substituted or unsubstituted aromatic hydrocarbon group, a C1 to C40 (or C3 to C24) substituted or unsubstituted aliphatic hydrocarbon group in which at least one methylene is replaced by sulfonyl (—SO$_2$—), carbonyl (CO), ether (—O—), sulfide (—S—), sulfoxide (—SO—), ester (—C(=O)O—), amide (—C(=O)NR—, wherein R is hydrogen or a C1 to C10 alkyl group), a moiety represented by Chemical Formula 1-1, or a combination thereof;

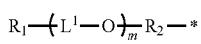

Chemical Formula 1-1 wherein, $R_1$ is hydrogen, a substituted or unsubstituted C1 to C30 alkylene moiety, a substituted or unsubstituted C1 to C30 alkyl ester moiety, a substituted or unsubstituted C1 to C10 alkoxy group, a hydroxy group, a carboxyl group, a (meth)acrylate group, an amine group, a maleimide group, a thiol group, an azide group, or a C1 to C10 fluorinated alkoxy group, $L^1$ is a direct bond, a substituted or unsubstituted C1 to C5 (C2 to C10) alkylene group, a substituted or unsubstituted C1 to C5 (C2 to C10) fluorinated alkyl group, or a combination thereof, $R_2$ is a direct bond, a substituted or unsubstituted C1 to C20 alkylene group, sulfonyl (—SO$_2$—), carbonyl (CO), ether (—O—), sulfide (—S—), sulfoxide (—SO—), ester (—C(=O)O—), amide (—C(=O)NR—), —NR—, or a combination thereof, wherein R is hydrogen or a C1 to C10 alkyl group, or a combination thereof,

* is a part linked to a Si atom of the organosilane compound, and m is 1 to 100 or 2 to 40.

In the above Chemical Formula 1, at least one A may be —O*.

A molecular weight of the organosilane compound may be greater than or equal to about 50 grams per mole (g/mol), greater than or equal to about 100 g/mol, greater than or equal to about 300 g/mol, or greater than or equal to about 500 g/mol.

The molecular weight of the organosilane compound may be less than or equal to about 20,000 g/mol, less than or equal to about 10,000 g/mol, less than or equal to about 5000 g/mol, less than or equal to about 4000 g/mol, less than or equal to about 3000 g/mol, less than or equal to about 2000 g/mol, or less than or equal to about 1000 g/mol.

The organosilane compound may include an organosilicon compound having a polyalkylene oxide moiety (for example, including one or more polyethylene glycol moiety).

The ink composition may have a viscosity of greater than or equal to about 5 centipoise (cPs), greater than or equal to about 7 cPs, or greater than or equal to about 9 cPs at a temperature of 25° C.

The ink composition may have a viscosity of less than or equal to about 35 cPs, less than or equal to about 30 cPs, less than or equal to about 28 cPs, or less than or equal to about 25 cPs at a temperature of 25° C.

The ink composition may include or may not include (or may exclude) a carboxylic acid group-containing binder polymer having an acid value of greater than or equal to about 50 milligrams per KOH per gram (mg KOH/g), or a thiol compound having two or more terminal thiols.

The ink composition may have a vapor pressure of less than or equal to about 1 mmHg at 20° C.

The ink composition may have a boiling point of greater than or equal to about 190° C.

The ink composition, as confirmed by dynamic light scattering (DLS) analysis, may exhibit an average particle size of less than or equal to about 2 micrometers (μm).

The luminescent nanostructure may include a Group II-VI compound, a Group III-V compound, a Group IV-VI compound, a Group IV element or compound, a Group II-III-VI compound, a Group I-II-IV-VI compound, or a combination thereof.

The luminescent nanostructures may not include cadmium. The luminescent nanostructures may not include mercury, lead, or a combination thereof.

The luminescent nanostructures may include a semiconductor nanocrystal core including indium, zinc, or a combination thereof, and a semiconductor nanocrystal shell disposed on the core and having a different composition from the core.

The luminescent nanostructures may include an organic ligand for example, on their surface, and the organic ligand may be RCOOH, RNH$_2$, R$_2$NH, R$_3$N, RSH, R$_3$PO, R$_3$P, ROH, RCOOR, RPO(OH)$_2$, RHPOOH, RHPOOH, R$_2$POOH, or a combination thereof, wherein each R is independently a substituted or unsubstituted C1 to C40 (C3 to C24) aliphatic hydrocarbon group, a substituted or unsubstituted C6 to C40 (C3 to C24) aromatic hydrocarbon group, or a combination thereof.

In an embodiment, a method for producing a pattern including a luminescent nanostructure composite, includes depositing the aforementioned composition on a substrate through a droplet discharging device to form a patterned film; and performing polymerization of (or polymerizing) the monomer.

The method may include or may not include (e.g., may exclude) a step of removing a volatile organic material.

In another embodiment, the luminescent nanostructure composite includes a matrix and a plurality of luminescent nanostructures and titanium oxide particles dispersed in the matrix, the titanium oxide particles have an average size of greater than or equal to about 10 nm and less than or equal to about 900 nm, the titanium oxide particles include an organosilane compound, and the titanium oxide particles further include aluminum.

In the titanium oxide particles or in the composite, an amount of aluminum may be about 0.1 wt % or more and less than or equal to about 10 wt % based on the total weight of the titanium oxide.

The organosilane compound may be bound to (e.g., bonded to) a surface of a titanium oxide particle.

In another embodiment, the color conversion panel includes a color conversion layer including a color conversion region, and optionally, a partition wall defining each region of the color conversion layer, wherein the color conversion region includes a first region configured to emit a first light and the first region includes the aforementioned luminescent nanostructure composite.

In another embodiment, the display panel includes the light emitting panel, the aforementioned color conversion panel, and optionally a light transmitting layer between the light emitting panel and the color conversion panel.

The ink composition of an embodiment may provide a luminescent nanostructure composite pattern without a subsequent development or solvent removal step. The ink composition may be applicable to an inkjet process. In the ink composition of an embodiment, the dispersibility of each component may be improved to provide a desired composition, and an occurrence or an observation of agglomeration may be suppressed. Moreover, adsorption of the ink composition to a device surface in (e.g., commercially available) inkjet printing devices may be suppressed, and/or stable discharge and pattern formation are possible without the formation of a hard cake that would then be difficult to redisperse.

DETAILED DESCRIPTION

Figure 1A:
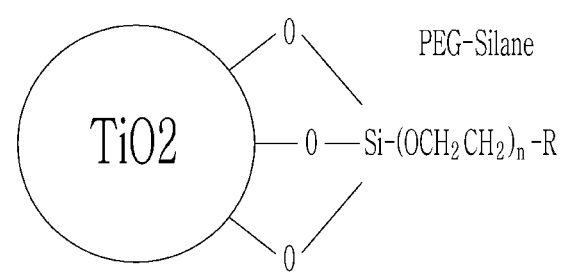
FIG. 1A schematically shows a titanium oxide particle with a bound organosilane compound in an ink composition according to a non-limiting embodiment.

Hereinafter, various embodiments of the present disclosure will be described in detail with reference to the accompanying drawings so that those of ordinary skill in the art may easily implement the present disclosure. The present disclosure may be implemented in various different forms and is not limited to the embodiments described herein.

The drawings and description are to be regarded as illustrative in nature and not restrictive. Like reference numerals designate like elements throughout the specification.

Exemplary embodiments are described herein with reference to cross section illustrations that are schematic illustrations of idealized embodiments. As such, variations from the shapes of the illustrations including the relative size and thickness of each constituent element as shown in the drawings are randomly indicated for better understanding and ease of description, and this disclosure is not necessarily limited to as shown. In the drawings, the thickness of layers, films, panels, regions, etc., are exaggerated for clarity. In addition, in the drawings, for better understanding and ease of description, the thickness of some layers and areas is exaggerated. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

Relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. In addition, unless explicitly described to the contrary, the word "comprise," or "include" and variations such as "comprises," "comprising,"

"includes," or "including," will be understood to imply the inclusion of stated elements but not the exclusion of any other elements.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10% or ±5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In addition, in this specification, the phrase "on a plane" means viewing a target portion from the top, and the phrase "on a cross-section" means viewing a cross-section formed by vertically cutting a target portion from the side.

As used herein, the expression "not including cadmium (or optionally, another harmful heavy metal)" may refer to the case in which a concentration of each of cadmium (or another heavy metal deemed harmful) may be less than or equal to about 100 parts per million by weight (ppmw), less than or equal to about 50 ppmw, less than or equal to about 10 ppmw, less than or equal to about 1 ppmw, less than or equal to about 0.1 ppmw, less than or equal to about 0.01 ppmw, or about zero. In an embodiment, substantially no amount of cadmium (or other heavy metal) may be present or, if present, an amount of cadmium (or other heavy metal) may be less than or equal to a detection limit or as an impurity level of a given analysis tool (e.g., an inductively coupled plasma atomic emission spectroscopy).

Hereinafter, as used herein, when a definition is not otherwise provided, "substituted" refers to replacement of hydrogen of a compound by a substituent selected from a C1 to C30 alkyl group, a C2 to C30 alkenyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (—F, —Cl, —Br, or —I), a hydroxy group (—OH), a nitro group (—NO$_2$), a cyano group (—CN), an amino group (—NRR' wherein R and R' are each independently hydrogen or a C1 to C6 alkyl group), an azido group (—N$_3$), an amidino group (—C(=NH)NH$_2$), a hydrazino group (—NHNH$_2$), a hydrazono group (=N(NH$_2$)), an aldehyde group (—C(=O)H), a carbamoyl group (—C(O)NH$_2$), a thiol group (—SH), an ester group (—C(=O)OR (wherein R is a C1 to C6 alkyl group or a C6 to C12 aryl group), a carboxyl group (—COOH) or a salt thereof (—C(=O)OM, wherein M is an organic or inorganic cation), a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), and a combination thereof.

In addition, when a definition is not otherwise provided below, "hetero" means one including 1 to 3 heteroatoms selected from N, O, S, Si, or P.

As used herein, "alkylene group" is a linear or branched saturated aliphatic hydrocarbon group that optionally may include a substituent and has two or more valences.

As used herein, "arylene group" may be a functional group that optionally includes at least one substituent and having two or more valences formed by removal of at least two hydrogens to form at least one aromatic ring.

In an embodiment, "aliphatic hydrocarbon group" may refer to a C1 to C30 linear or branched alkyl group, a C1 to C30 linear or branched alkenyl group, or a C1 to C30 linear or branched alkynyl group.

In an embodiment, "aromatic organic group" may refer to a C6 to C30 aryl group or a C2 to C30 heteroaryl group.

In an embodiment, "alicyclic organic group" may refer to a C3 to C30 cycloalkyl group, a C3 to C30 cycloalkenyl group, and a C3 to C30 cycloalkynyl group.

As used herein, the term "(meth)acrylate" refers to acrylate and/or methacrylate.

As used herein, "Group" refers to a Group of Periodic Table.

As used herein, "Group II" refers to Group IIA and a Group IIB, and examples of the Group II metal may include Cd, Zn, Hg, and Mg, but are not limited thereto.

"Group III" refers to a Group IIIA and a Group IIIB, and examples of the Group III metal may include Al, In, Ga, and Tl, but are not limited thereto.

As used herein, "Group V" refers to Group VA, and examples may include nitrogen, phosphorus, arsenic, antimony, and bismuth, but are not limited thereto.

As used herein, "Group VI" refers to Group VIA, and examples may include sulfur, selenium, and tellurium, but are not limited thereto.

Herein, the term "nanostructure" refers to at least one region having a nanoscale dimension or a structure having a characteristic dimension. In an embodiment, the dimensions of the nanostructures may be less than about 300 nm, less than about 250 nm, less than about 150 nm, less than about 100 nm, less than about 50 nm, or less than about 30 nm. These structures may have any shape. The nanostructures may have any shape, such as nanowires, nanorods, nanotubes, multi-pod type shapes having two or more pods, nanodots (or quantum dots), and are not particularly limited. The nanostructures may be, for example, substantially crystalline, substantially monocrystalline, polycrystalline, amorphous, or a combination thereof.

The luminescent nanostructure refers to (e.g., semiconductor-based) nanocrystals that exhibit quantum confinement or exciton confinement, and are a type of luminescent nanostructures (e.g., capable of emitting light by energy excitation). Herein, the shape of the "luminescent nanostructure" is not limited unless otherwise defined.

In an embodiment, "dispersion" may refer to a system wherein a dispersed phase is a solid and a continuous phase includes a liquid or a solid different from the dispersed phase. In an embodiment, "dispersion" refers to a colloidal dispersion wherein the dispersed phase has a dimension of greater than or equal to about 1 nm, for example, greater than or equal to about 2 nm, greater than or equal to about 3 nm, or greater than or equal to about 4 nm and several micrometers (pm) or less, (e.g., about 2 μm or less or about 1 μm or less).

Herein, the mean may be median or mean. In an embodiment, the average may be mean.

Herein, quantum efficiency may be easily and reproducibly determined using commercially available equipment (e.g., from Hitachi or Hamamatsu, etc.) and referring to manuals provided by, for example, respective equipment manufacturers. Quantum efficiency (or quantum yield) may be measured either in solution or in the solid state (in a composite). In an embodiment, quantum efficiency (or quantum yield) is the ratio of photons emitted to photons absorbed by the nanostructure or population thereof. In an embodiment, quantum efficiency may be measured by any method. For example, for fluorescence quantum yield or efficiency, there may be two methods: an absolute method and a relative method. As used herein, quantum efficiency measured by the absolute method is referred to as absolute quantum efficiency.

In the absolute method, quantum efficiency is obtained by detecting the fluorescence of all samples through an integrating sphere. In the relative method, the quantum efficiency of the unknown sample is calculated by comparing the fluorescence intensity of a standard dye (standard sample) with the fluorescence intensity of the unknown sample. Coumarin 153, Coumarin 545, Rhodamine 101 inner salt, Anthracene and Rhodamine 6G may be used as standard dyes according to their PL wavelengths, but the present disclosure is not limited thereto. The full width at half maximum and the maximum PL peak wavelength may be measured, for example, by a photoluminescence spectrum obtained by a spectrophotometer such as a fluorescence spectrophotometer or the like.

Herein, the "first absorption peak wavelength" refers to the wavelength of the first main peak appearing in the lowest energy region in the UV-Vis absorption spectrum.

As used herein, "(total) solids content" of a composition refers to the amount of non-volatile substance (i.e., components in the ink composition except for an organic solvent that will be evaporated during a process such a patterning process) In the ink composition of an embodiment, a non-volatile substance such as luminescent structures, the oxide particles, a polymer, a monomer, an initiator, or the like may be left therein once the volatile solvent has vaporized. In an embodiment, a composition may have a total solid content of 100%, and thus the composition may be a (volatile) solvent free system and may not substantially have an organic solvent that will be evaporated during a process. In an embodiment, an ink composition may include a volatile organic solvent in a limited amount or it not include a volatile solvent. In an embodiment, when the ink composition is thermally treated at a predetermined temperature (e.g., a temperature of from about 100° C. to about 200° C.) for example at an atmospheric pressure, a weight change (decrease) of the ink composition may be less than or equal to about 10%, less than or equal to about 9%, less than or equal to about 8%, less than or equal to about 7%, less than or equal to about 6%, less than or equal to about 5%, less than or equal to about 4%, less than or equal to about 3%, less than or equal to about 2%, less than or equal to about 1%, less than or equal to about 0.5%, or less than or equal to about 0.1%, based on its initial weight.

A luminescent nanostructure (e.g., a quantum dot) may include a nano-sized semiconductor nanocrystal and may exhibit a quantum confinement effect. When the luminescent nanostructures receive light from an excitation source and reach an energy exited state, energy (e.g., light) according to bandgap energy may be emitted. For application on devices, the luminescent nanostructures may be dispersed in a matrix to have a composite film (or a pattern thereof). in case of the luminescent nanostructures, for forming a pattern including them, a research on a photoresist composition including the same has been conducted. However, a photolithography process may consume a relatively large amount of the composition and may involve several relatively complex processes such as pre-baking, developing, post-baking, or the like.

An ink jetting process may provide a relatively large-area film or pattern of a luminescent nanostructure composite for example with high efficiency. However, the present inventors have found that the inkjet process may have difficulty in providing a desired pattern when using a conventional luminescent nanostructure composition for example designed for a photoresist process. Without wishing to be bound by any theory, in order to apply the luminescent nanostructures to the inkjet process, an ink composition including the luminescent nanostructures may exhibit a transfer property enabling a relatively free flow of the composition (e.g., in terms of a viscosity at a desired level) when the composition is in a printer nozzle, an ink reservoir, a pipe, or the like. In addition to such a transferring property, it may be desired that particle components (for example, the luminescent nanostructures or metal oxide fine particles for light diffusion) maintain their dispersibility without substantial agglomeration, sedimentation, etc., over time.

The present inventors have found that an ink composition including a desired amount of the luminescent nanostructures and a desired amount of light diffusing agent may tend to stick or adsorb to one or more surfaces of an ink jet printing equipment (e.g., an ink jet printer), and this may further interrupt the free flow of the ink composition during a printing process (e.g., as the pattern is being printed).

The present inventors have also identified that even though dispersibility or adsorbing or sticking property of the luminescent nanostructures of relatively small size may be relatively controlled, the presence of titanium metal oxide particles, which are added to the ink composition for light diffusion, in the composite may result in an increase in sedimentation, agglomeration, and adsorption. for example, onto one or more equipment surfaces of an ink jet printer.

The ink composition according to an embodiment includes titanium metal oxide particles, which are described herein, together with the luminescent nanostructures (e.g., quantum dots), whereby the ink composition maintains an improved level of dispersibility and/or substantially reduces or minimizes the problem of the ink composition adsorbing (or sticking) onto one or more equipment surfaces of a printer device. Moreover, substantially little or no adverse effects may be observed on a luminescent property (e.g., light conversion) of the luminescent nanostructures in ink composition. The ink composition according to an embodiment may provide a luminescent nanostructure composite film (or a pattern thereof) exhibiting improved properties that can be obtained, for example, by a solution process.

In an embodiment, an ink composition includes titanium oxide particles, a plurality of luminescent nanostructures, a monomer including a carbon-carbon unsaturated bond (e.g., a liquid monomer), and initiator (e.g., a photo or thermal initiator). The titanium oxide particles have an average size of about 10 nm to about 900 nm or about 50 nm to about 200 nm. The ink composition may have a total solid content of greater than or equal to about 90 wt % based on the total weight of the composition. The amount of the titanium oxide particles in the ink composition may be greater than or equal to about 1 wt % based on the total weight or the total solid content of the ink composition. The ink composition is configured to a emit first light (or light of a predetermined wavelength, hereinafter, referred to as first light).

The first light may be green light, red light, or blue light (depending on the plurality of the luminescent nanostructures). The green light may have a maximum emission peak wavelength within a range of about 500 nm to about 580 nm. The red light may have a maximum emission peak wavelength within a range of 650 nm to 670 nm. The blue light may have a maximum emission peak wavelength within a range of about 440 nm to about 490 nm. The first light may have a single luminescent main peak (e.g., may be light of a single color), and the luminescent main peak may have a full width at half maximum (FWHM) of less than or equal to about 45 nm, less than or equal to about 40 nm, less than or equal to about 35 nm, less than or equal to about 30 nm, or less than or equal to about 25 nm. The FWHM may be greater than or equal to about 5 nm, greater than or equal to about 10 nm, or greater than or equal to about 15 nm.

As used herein, the solid content may be an amount of components (e.g., a monomer, a metal oxide particle, luminescent nanostructures, a dispersing agent, an initiator, and the like) except for a volatile organic component (e.g., an organic solvent) that is volatilized and/or removed for example during a pattern forming process such as an inkjet printing process. The organic component or the organic solvent may be removed at a predetermined temperature of greater than or equal to about room temperature and less than or equal to about 150° C., less than or equal to about 130° C., less than or equal to about 100° C., less than or equal to about 80° C., less than or equal to about 60° C., less than or equal to about 50° C., less than or equal to about 30° C., or less than or equal to about 20° C.

In an embodiment, the ink composition may include or may not include an organic solvent (e.g., in a limited amount), and therefore, the composition may have a relatively high total solid content. The total solid content of the ink composition may be greater than or equal to about 91 wt %, greater than or equal to about 92 wt %, greater than or equal to about 93 wt %, greater than or equal to about 94 wt %, greater than or equal to about 95 wt %, greater than or equal to about 96 wt %, greater than or equal to about 97 wt %, greater than or equal to about 98 wt %, greater than or equal to about 99 wt %, or greater than or equal to about 99.5 wt %. The total solid content of the ink composition may be less than or equal to about 100 wt %, less than or equal to about 99.9 wt %, less than or equal to about 99 wt %, less than or equal to about 98 wt %, or less than or equal to about 97 wt %. The ink composition may not substantially include a volatile organic solvent.

The organic solvent may include a substituted or unsubstituted C3 to C40 aliphatic hydrocarbon solvent, a substituted or unsubstituted C6 to C40 aromatic hydrocarbon solvent, a substituted or unsubstituted C3 to C40 alicyclic hydrocarbon solvent, an alkylene glycol alkylether acetate solvent, an alkyl acetamide solvent, or a combination thereof. The organic solvent may have a vapor pressure of less than or equal to about 5 mmHg, less than or equal to about 4 mmHg, less than or equal to about 3.5 mmHg, less than or equal to about 3 mmHg, less than or equal to about 2.5 mmHg, or less than or equal to about 1 mmHg. The vapor pressure may be greater than about 0.01 mmHg, greater than about 0.05 mmHg, greater than about 0.1 mmHg, or greater than about 0.5 mmHg.

The organic solvent may include dipropylene glycol monomethylether acetate (DPMA), polyglycidyl methacrylate (PGMA), diethyleneglycol monoethylether acetate (EDGAC), propyleneglycol methylether acetate (PGMEA), dialkylacetamide (e.g., dimethyl acetamide (DMA)), cyclohexyl acetate (CHA), or a combination thereof. The organic solvent may or may not include chloroform, chlorobenzene (or halogenated aromatics), cyclohexane, hexane, heptane, octane, hexadecane, undecane, decane, dodecane, xylene, toluene, benzene, octadecane, tetradecane, butyl ether, ethanol, or a combination thereof.

In the ink composition, an amount of the organic solvent, based on the total weight of the ink composition, may be greater than or equal to about 0.01 wt %, greater than or equal to about 0.05 wt %, greater than or equal to about 0.1 wt %, greater than or equal to about 0.5 wt %, greater than or equal to about 1 wt %, greater than or equal to about 2 wt %, greater than or equal to about 3 wt %, greater than or equal to about 4 wt %, greater than or equal to about 5 wt %, greater than or equal to about 6 wt %, greater than or equal to about 7 wt %, greater than or equal to about 8 wt %, or greater than or equal to about 9 wt %. In the ink composition, the content of the organic solvent, based on the total weight of the ink composition, less than or equal to about 10 wt %, less than or equal to about 9 wt %, less than or equal to about 8 wt %, less than or equal to about 7 wt %, less than or equal to about 6 wt %, less than or equal to about 5 wt %, less than or equal to about 4 wt %, less than or equal to about 3 wt %, less than or equal to about 2 wt %, less than or equal to about 1 wt %, or less than or equal to about 0.5 wt %.

Figure 1B:
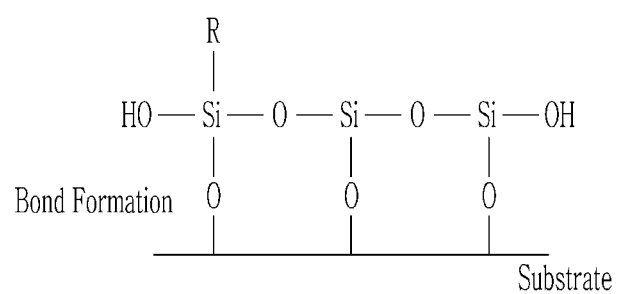
FIG. 1B schematically shows a titanium oxide particle with a bound organosilane compound in an ink composition according to a non-limiting embodiment.
Figure 1C:
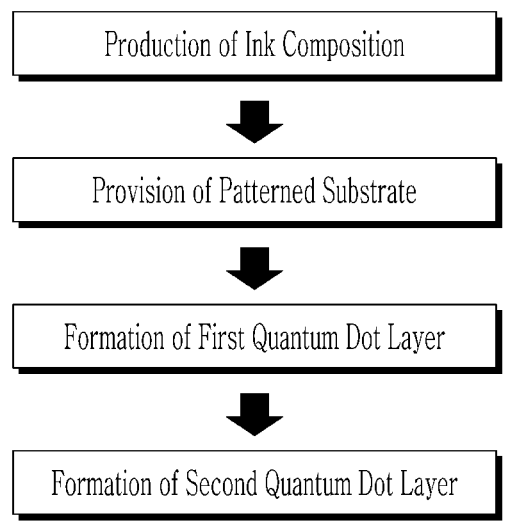
FIG. 1C schematically shows a pattern forming process using the ink composition of an embodiment.

In a non-limiting embodiment, referring to FIG. 1A, the ink composition may include the titanium oxide particle including an organosilane compound (for example, bound to a surface of the particle). In an embodiment, the composition may include a limited amount of organic solvent or may be substantially free of organic solvent, and even in such a composition, the titanium oxide particle included in the composition of the embodiment may maintain improved dispersibility (e.g., during the ink jet process) and the composition of an embodiment may exhibit a desired property (e.g., a reduced level of adsorbing of the ink to a surface of the printing equipment). In a non-limiting embodiment, referring to FIG. 1B, a molecule(s) of an organosilane compound may be bound (e.g., bonded) to a particle (e.g., a substrate). Without wishing to be bound by any theory, at least one or a plurality (e.g., two or three) alkoxy group(s) in an organosilane compound for example, represented by Si—(OCH$_3$)$_3$ may be attached to a TiO$_2$ substrate, and/or the molecules of the organosilane compound may be linked to each other. In an embodiment, the titanium oxide particle may include, for example, a layer of the organosilane compound bonded on a surface thereof. The organosilane compound may be a PEG silane compound. The PEG silane compound may be a silane compound having a plurality of (e.g., greater than two, three, four and less than or equal to about 100, 50, 30, or 20) ethylene glycol repeating units. The organosilane compound may have a moiety represented by Chemical Formula 1-1:

Chemical Formula 1-1

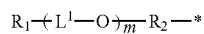

wherein, R$_1$ is hydrogen, a substituted or unsubstituted C1 to C30 alkyl group, a substituted or unsubstituted C1 to C30 alkyl group, a substituted or unsubstituted C1 to C30 alkyl ester moiety, a substituted or unsubstituted C1 to C10 alkoxy group, a hydroxy group, a carboxyl group, a (meth)acrylate group, an amine group, a maleimide group, a thiol group, an azide group, an azide group, or a C1 to C10 fluorinated alkoxy group, $L^1$ is a direct bond, a substituted or unsubstituted C1 to C10 or C2 to C5 alkylene group, a substituted or unsubstituted C1 to C10 or C2 to C5 (e.g., C1 to C5) fluorinated alkylene group, or a combination thereof $R_2$ is a direct bond, a substituted or unsubstituted C1 to C20 alkylene group, sulfonyl (—$SO_2$—), carbonyl (CO), ether (—O—), sulfide (—S—), sulfoxide (—SO—), ester (—C(=O)O—), —NR—, amide (—C(=O)NR—), or a combination thereof, wherein R is hydrogen or a C1 to C10 alkyl group,

* represents a part connected to a Si atom of the organosilane compound, and m is 1 to 100, or 2 to 40, or 2 to 30, or 3 to 20 or 4 to 15.

The organosilane compound may include a compound represented by Chemical Formula 1:

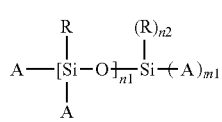

Chemical Formula 1 n1 is an integer of 0 to 10, or 2 to 9, 3 to 8 or 4 to 7, n2 is an integer of 1 to 3, m1 is 0 or an integer of 1 to 2, n2+m1 is 3, each A is the same or different, and each independently a hydroxyl group, a substituted or unsubstituted C1 to C10 alkoxy group, chlorine, —O*, wherein * of —O* is a part to be linked to a surface of the luminescent nanostructure, or a combination thereof, and each R is the same or different, and each independently a C1 to C40 (or C3 to C24) substituted or unsubstituted aliphatic hydrocarbon group, a C6 to C40 substituted or unsubstituted aromatic hydrocarbon group, a C1 to C40 (or C3 to C24) substituted or unsubstituted aliphatic hydrocarbon group in which at least one methylene is replaced by sulfonyl (—$SO_2$—), carbonyl (CO), ether (—O—), sulfide (—S—), sulfoxide (—SO—), ester (—C(=O)O—), amide (—C(=O)NR—, wherein R is hydrogen or a C1 to C10 alkyl group), a moiety represented by Chemical Formula 1-1, or a combination thereof;

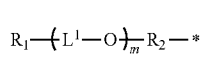

Chemical Formula 1-1 wherein, $R_1$ is hydrogen, a substituted or unsubstituted C1 to C30 alkyl group, a substituted or unsubstituted C1 to C30 alkyl ester, a substituted or unsubstituted C1 to C10 alkoxy group, a hydroxy group, a carboxyl group, a (meth)acrylate group, an amine group, a maleimide group, a thiol group, an azide group, or a C1 to C10 fluorinated alkoxy group, $L^1$ is a direct bond, a substituted or unsubstituted C1 to C10 or C2 to C5 alkylene group, a substituted or unsubstituted C1 to C10 or C2 to C5 (e.g., C1 to C5) fluorinated alkylene group, or a combination thereof, $R_2$ is a direct bond, a substituted or unsubstituted C1 to C20 alkylene group, sulfonyl (—$SO_2$—), carbonyl (CO), ether (—O—), sulfide (—S—), sulfoxide (—SO—), ester (—C(=O)O—), —NR—, amide (—C(=O)NR—), or a combination thereof, wherein R is hydrogen or a C1 to C10 alkyl group, or a combination thereof,

* represents a part connected to Si atom of the organosilane compound, and m is 1 to 40, or 2 to 30, or 3 to 20 or 4 to 15.

In the above Chemical Formula 1, at least one A may be —O*.

A molecular weight of the organosilane compound may be greater than or equal to about 50 g/mol, greater than or equal to about 100 g/mol, greater than or equal to about 200 g/mol, greater than or equal to about 300 g/mol, greater than or equal to about 400 g/mol, greater than or equal to about 500 g/mol, greater than or equal to about 600 g/mol, greater than or equal to about 700 g/mol, greater than or equal to about 800 g/mol, greater than or equal to about 900 g/mol, greater than or equal to about 1,000 g/mol, greater than or equal to about 1200 g/mol, greater than or equal to about 1500 g/mol, or greater than or equal to about 2000 g/mol. The molecular weight of the organosilane compound may be less than or equal to about 20,000 g/mol, less than or equal to about 10,000 g/mol, less than or equal to about 9000 g/mol, less than or equal to about 8000 g/mol, less than or equal to about 7000 g/mol, less than or equal to about 6000 g/mol, less than or equal to about 5000 g/mol, less than or equal to about 4000 g/mol, less than or equal to about 3000 g/mol, less than or equal to about 2000 g/mol, or less than or equal to about 1800 g/mol.

The organosilane compound may include an organosilicon compound having a polyalkylene oxide moiety.

The organosilane compound may include a compound represented by the following chemical formula:

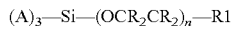

In the above chemical formula, each A is the same or different, and each independently hydrogen, a hydroxyl group, a substituted or unsubstituted C1 to C10 alkoxy group, chlorine, —O* (wherein * represents a connection point to a surface of the luminescent nanostructure), or a combination thereof, each R is independently hydrogen, a substituted or unsubstituted C1 to C10 alkyl group, or a combination thereof, R1 is hydrogen, a substituted or unsubstituted C1 to C30 alkyl ester, a substituted or unsubstituted C1 to C10 alkoxy group, a hydroxy group, a carboxyl group, a (meth)acrylate group, an amine group, a maleimide group, a thiol group, an azide group, a C1 to C10 fluorinated alkoxy group, a substituted or unsubstituted C1 to C40 (or C3 to C24) aliphatic hydrocarbon (alkyl, alkenyl, or alkynyl) group, a substituted or unsubstituted C6 to C40 aromatic hydrocarbon group, a substituted or unsubstituted C1 to C40 (or C3 to C24) aliphatic or aromatic hydrocarbon group where at least one methylene may be replaced with sulfonyl (—$SO_2$—), carbonyl (CO), ether (—O—), sulfide (—S—), sulfoxide (—SO—), ester (—C(=O)O—), —NR—, or amide (—C(=O)NR—), wherein R is hydrogen or a C1 to C10 alkyl group, and n is 0 to 100, 1 to 40, or 2 to 30, or 3 to 20 or 4 to 15, or 5 to 12.

At least one of the A may be —O*.

The present inventors have surprisingly found that by the inclusion of the titanium oxide particles with the aforementioned surface-treating agent in an ink composition as described may exhibit a desired property even with a limited amount of a solvent or substantially without any solvent, and the desired property may be maintained over time. Without wishing to be bound by any theory, it is believed that the organosilane compound having, for example, a main tail such as an alkylene glycol moiety may be chemically bound (or bonded) to the titanium oxide particle, and thus, may make contribute to achieving a desired effect.

Without wishing to be bound by any theory, it is believed that in a composition of an embodiment, the titanium oxide particle including the above organosilane compound may contribute to reducing a difference between a zeta-potential of a surface of a particle in an acrylate based vehicle environment and a zeta-potential of a part surface of an ink delivery equipment (a printer and the like) for example made of a Stainless Use Steel (SUS), glass, Teflon, and the like) and minimizing an electrostatic adsorption tendency. In addition, it is believed that an extended tail portion (e.g., an oxy-alkylene tail) of the organosilane compound may physically prevent or minimize agglomeration of particles themselves or an interaction of the particle with a surface of the equipment (e.g., the SUS). Accordingly, in the composition of an embodiment, formation of a hard cake, which is not readily dispersible once formed, may be effectively suppressed.

The titanium oxide particle included in the ink composition of an embodiment may exhibit a positive zeta potential (for example, as measured after being dispersed in propylene glycol monomethyl ether acetate (PGMEA) or THF). The zeta potential may be easily and reproducibly measured by using a commercially available zeta potential analyzer. The zeta potential may be greater than or equal to about +1 millivolt (mV), greater than or equal to about 3 mV, greater than or equal to about +5, greater than or equal to about +7 mV, greater than or equal to about +9 mV, greater than or equal to about +10 mV, greater than or equal to about +12 mV, greater than or equal to about +14 mV, greater than or equal to about +15 mV, greater than or equal to about +17 mV, greater than or equal to about +19 mV, greater than or equal to about +20 mV, greater than or equal to about +23 mV, or greater than or equal to about +25 mV. The zeta potential may be less than or equal to about +70 mV, less than or equal to about +65 mV, less than or equal to about +55 mV, less than or equal to about +45 mV, less than or equal to about +40 mV, less than or equal to about +38 mV,+35 mV, less than or equal to about +33 mV, less than or equal to about +31 mV, less than or equal to about +29 mV, or less than or equal to about +27 mV.

As the titanium oxide particles including an organosilane compound may have a controlled surface charge, a surface potential difference from a stainless steel surface, which can be a main component of an ink jet device, may be reduced, and thereby, electrostatic attraction may be reduced. The zeta potential of the titanium oxide particle may have a same sign of a charge with the material surface of the ink jet equipment such as stainless steel, a polytetrafluorethylene (a TEFLON), or a polyimide.

The titanium oxide particle may show an improved property, for example, a reduced electrostatic adsorption for a stainless steel or glass substrate. Determination of how much of a given dispersion can be adsorbed to a target substrate may be carried out by dropping the given dispersion on the target substrate and removing the same with blowing or forced air after a predetermined time (e.g., about 24 hours), and then, measuring a contact angle change for the target substrate. In an embodiment, the titanium oxide included in the composition according to an embodiment may exhibit a surface energy difference of less than about 12 dyne per centimeter (dyn/cm), for example, less than about 10 dyn/cm, less than or equal to about 9.5 dyn/cm, or less than or equal to about 9 dyn/cm, which is measured from a contact angle with respect to a target substrate e.g., a SUS (stainless steel).

The titanium oxide particle may further include aluminum (e.g., an aluminum oxide). In an embodiment, the titanium oxide particle may further include aluminum or aluminum oxide, further improving an effect of the organosilane compound.

In the titanium oxide particle or the ink composition, an amount of the aluminum may be greater than or equal to about 0.1 wt %, greater than or equal to about 0.3 wt %, greater than or equal to about 0.5 wt %, greater than or equal to about 0.7 wt %, greater than or equal to about 1 wt %, greater than or equal to about 1.5 wt %, or greater than or equal to about 2 wt % based on the total weight of the titanium oxide. In the titanium oxide particle or the ink composition, an amount of aluminum may be less than or equal to about 10 wt %, less than or equal to about 9 wt %, less than or equal to about 8 wt %, less than or equal to about 7 wt %, less than or equal to about 6 wt %, less than or equal to about 5 wt %, less than or equal to about 4 wt %, less than or equal to about 3 wt %, or less than or equal to about 2 wt % based on the total weight of the titanium oxide.

In the titanium oxide particle or the ink composition, an amount of the organosilane compound may be greater than or equal to about 0.1 wt %, greater than or equal to about 0.3 wt %, greater than or equal to about 0.5 wt %, greater than or equal to about 0.7 wt %, greater than or equal to about 1 wt %, greater than or equal to about 1.5 wt %, or greater than or equal to about 2 wt % based on the total weight of the titanium oxide. In the titanium oxide particle or the ink composition, an amount of the organosilane compound may be less than or equal to about 10 wt %, less than or equal to about 9 wt %, less than or equal to about 8 wt %, less than or equal to about 7 wt %, less than or equal to about 6 wt %, less than or equal to about 5 wt %, less than or equal to about 4 wt %, less than or equal to about 3 wt %, or less than or equal to about 2 wt % based on the total weight of the titanium oxide.

The amount of component(s) may be confirmed by using an appropriate analysis (e.g., a thermogravimetric analysis, Gas chromatography—mass spectrometry, Liquid chromatography—mass spectrometry (LC-Ms), an NMR analysis, an IR spectrometry, XPS, XRD, pyrolysis-gas chromatography/mass spectrometry, Py-GC, or a combination thereof).

The titanium oxide particles may have an average size of greater than or equal to about 50 nm, greater than or equal to about 150 nm, greater than or equal to about 180 nm, or greater than or equal to about 200 nm. The titanium oxide particles may have an average size of less than or equal to about 900 nm, less than or equal to about 500 nm, less than or equal to about 400 nm, less than or equal to about 350 nm, or less than or equal to about 300 nm. In the present specification, the average size may be mean or median. In an embodiment, the average may be mean.

In the ink composition, an amount of the titanium oxide particle (or the titanium oxide particles including an organosilane compound) may be greater than or equal to about 1 wt %, greater than or equal to about 2 wt %, greater than or equal to about 3 wt %, greater than or equal to about 4 wt %, greater than or equal to about 5 wt %, greater than or equal to about 10 wt %, greater than or equal to about 15 wt %, or greater than or equal to about 18 wt % based on a total weight or a total solid weight of the composition. In the ink composition, an amount of the titanium oxide particle (or the titanium oxide particles including an organosilane compound) may be less than or equal to about 30 wt %, less than or equal to about 25 wt %, less than or equal to about 20 wt %, less than or equal to about 15 wt %, less than or equal to about 10 wt %, less than or equal to about 9 wt %, less than or equal to about 8 wt %, less than or equal to about 7 wt %, less than or equal to about 6 wt %, or less than or equal to about 5 wt % based on a total weight or a total solid content of the composition.

The titanium oxide particle(s) including an organosilane compound may be obtained in an appropriate method. In an embodiment, a method producing the titanium oxide particle may include mixing (and/or ball-milling) titanium oxide particles having a predetermined (average) size in an organic solvent, for example, an organic acid compound (e.g., a C1 to C40 or C2 to C25 carboxylic acid compound), a hydrophobic organic solvent such as a substituted or unsubstituted C1 to C30 aliphatic hydrocarbon solvent (an alkane, alkene, alkyne solvent) or a combination thereof, and then, adding a mixed solution of an organosilane compound, an acid catalyst (e.g., a carboxylic acid), and water thereto and then, a repeat mixing (and/or ball-milling) of the mixture. The method may include recovering and separating treated titanium oxide particles from the mixture and optionally purifying the same (for example, a wash with ethyl acetate) to remove any unbound organosilane compound. The organosilane compound-treated titanium oxide particle(s) as obtained may be heat-treated at a temperature of greater than or equal to about 50° C. or greater than or equal to about 100° C. and less than or equal to about 200° C. or less than or equal to about 150° C. The dried particles may be subjected to an additional process (e.g., grinding and/or milling).

An amount of the organic acid compound for use in the method may be greater than or equal to about 0.01 wt %, greater than or equal to about 0.05 wt %, greater than or equal to about 0.1 wt %, greater than or equal to about 0.5 wt %, greater than or equal to about 1 wt %, greater than or equal to about 3 wt %, greater than or equal to about 5 wt %, greater than or equal to about 7 wt %, greater than or equal to about 9 wt %, greater than or equal to about 10 wt %, or greater than or equal to about 15 wt %, based on a total weight of titanium oxide particle. An amount of the organic acid compound for use in the method may be less than or equal to about 50 wt %, less than or equal to about 40 wt %, less than or equal to about 30 wt %, less than or equal to about 25 wt %, less than or equal to about 20 wt %, less than or equal to about 15 wt %, less than or equal to about 10 wt %, less than or equal to about 7 wt %, less than or equal to about 4 wt %, less than or equal to about 2 wt %, or less than or equal to about 1 wt %, based on a total weight of titanium oxide particle.

In an embodiment, the organic solvent may include the hydrophobic organic solvent (e.g., the alkane solvent) and the organic acid compound, and a weight ratio of the organic acid compound relative to the hydrophobic solvent (e.g., the alkane solvent) may be in a range of about 1:100 to about 100:1, about 1:50 to about 50:1, about 1:30 to about 30:1, about 1:10 to about 10:1, or a combination thereof.

A mixing weight ratio of the mixed solution of the water and the acid catalyst relative to the organosilane compound may be about 1:100 to about 100:1, about 1:50 to about 50:1, about 1:30 to about 30:1, about 1:10 to about 10:1, about 1:5 to about 5:1, about 1:3 to about 3:1, about 1:2 to about 2:1, or a combination thereof.

In an embodiment, the titanium oxide particles may be mixed with a monomer described herein, and then may be mixed with an organic solution including luminescent nanostructures.

The plurality of luminescent nanostructures may include a Group II-VI compound, a Group III-V compound, a Group IV-VI compound, a Group IV element or compound, a Group compound, a Group II-III-VI compound, a Group I-II-IV-VI compound, or a combination thereof. The plurality of luminescent nanostructures may not contain cadmium. The plurality of luminescent nanostructures may not include lead, mercury, or a combination thereof.

The Group II-VI compound may be selected from a binary element compound selected from CdSe, CdTe, ZnS, ZnSe, ZnTe, ZnO, HgS, HgSe, HgTe, MgSe, MgS, and a mixture thereof; a ternary element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a quaternary element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The Group II-VI compound may further include a Group III metal.

The Group III-V compound may be selected from a binary element compound selected from GaN, GaP, GaAs, GaSb, AlN, AlP, AlAs, AlSb, InN, InP, InAs, InSb, and a mixture thereof; a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, and a mixture thereof; and a quaternary element compound selected from GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, InZnP, and a mixture thereof. The Group III-V compound may further include a Group II metal (e.g., InZnP)

The Group IV-VI compound may be selected from a binary element compound selected from SnS, SnSe, SnTe, PbS, PbSe, PbTe, and a mixture thereof; a ternary element compound selected from SnSeS, SnSeTe, SnSTe, PbSeS, PbSeTe, PbSTe, SnPbS, SnPbSe, SnPbTe, and a mixture thereof; and a quaternary element compound selected from SnPbSSe, SnPbSeTe, SnPbSTe, and a mixture thereof.

The Group compound may include $CuInSe_2$, CuInS2, CuInGaSe, and CuInGaS, but is not limited thereto. The Group I-II-IV-VI compound may include CuZnSnSe, and CuZnSnS but is not limited thereto.

The Group IV element or compound may include a single element selected from Si, Ge, and a mixture thereof; and a binary element compound selected from SiC, SiGe, and a mixture thereof.

The binary element compound, the ternary element compound or the quaternary element compound respectively exist in a uniform concentration in the particle or partially different concentrations in the same particle. The luminescent nanostructure may have a core/shell structure in which a first semiconductor nanocrystal surrounds another second semiconductor nanocrystal. The interface between the core and the shell may have a concentration gradient in which the concentration of an element that is present in the shell decreases toward the center. In addition, the semiconductor nanocrystal may have a structure including one semiconductor nanocrystal core and a multi-layered shell surrounding the semiconductor nanocrystal core. In this case, the multi-layered shell structure has a shell structure of two or more layers, and each layer may have a single composition or alloy or concentration gradient.

In the luminescent nanostructure, the shell material and the core material may have different bandgap energies. For example, the bandgap energy of the shell material may be greater than that of the core material. In another embodiment, the bandgap energy of the shell material may be less than that of the core material. The light emitting nanostructure may have a multi-layered shell. In a multi-layered shell, the energy bandgap of the outer layer may be larger than the energy bandgap of the inner layer (i.e., the layer closer to the core). In the multi-layered shell, the energy bandgap of the outer layer may be smaller than the energy bandgap of the inner layer. The luminescent nanostructure may control the absorption/emission wavelength by adjusting the composition and size. The luminescent nanostructures may emit green light, red light, or blue light. The maximum emission peak wavelength of the luminescent nanostructure may have a wavelength range of ultraviolet to infrared wavelengths or higher.

For example, a maximum emission peak wavelength of the luminescent nanostructure may be greater than or equal to about 300 nm, for example, greater than or equal to about 500 nm, greater than or equal to about 510 nm, greater than or equal to about 520 nm, greater than or equal to about 530 nm, greater than or equal to about 540 nm, greater than or equal to about 550 nm, greater than or equal to about 560 nm, greater than or equal to about 570 nm, greater than or equal to about 580 nm, greater than or equal to about 590 nm, greater than or equal to about 600 nm, or greater than or equal to about 610 nm. The maximum emission peak wavelength of the luminescent nanostructure may be in the range of less than or equal to about 800 nm, for example, 650 nm, less than or equal to about 640 nm, less than or equal to about 630 nm, less than or equal to about 620 nm, less than or equal to about 610 nm, less than or equal to about 600 nm, less than or equal to about 590 nm, less than or equal to about 580 nm, less than or equal to about 570 nm, less than or equal to about 560 nm, less than or equal to about 550 nm, or less than or equal to about 540 nm. The maximum emission peak wavelength of the luminescent nanostructure may be in the range of about 500 nm to about 650 nm. The maximum emission peak wavelength (or the wavelength of the green light) of the luminescent nanostructure emitting green light may be in the range of about 500 nm to about 580 nm, about 510 nm to about 560 nm, or about 520 nm to about 540 nm. The maximum emission peak wavelength of the luminescent nanostructure emitting the red light (or the wavelength of the red light) may be in the range of about 600 nm to about 670 nm, about 10 nm to about 650 nm, or about 620 nm to about 640 nm.

The luminescent nanostructures may have a quantum efficiency of greater than or equal to about 10%, for example, greater than or equal to about 30%, greater than or equal to about 50%, greater than or equal to about 60%, greater than or equal to about 70%, greater than or equal to about 90%, or even about 100%. The luminescent nanostructure may have a full width at half maximum (FWHM) of the emission wavelength spectrum of, for example, less than or equal to about 50 nm, for example less than or equal to about 45 nm, less than or equal to about 40 nm, or less than or equal to about 30 nm.

The luminescent nanostructure(s) may have an (average) size of greater than or equal to about 1 nm and less than or equal to about 100 nm. The (average) size of the luminescent nanostructure(s) may be about 1 nm to about 20 nm, for example, greater than or equal to about 2 nm, greater than or equal to about 3 nm, or greater than or equal to about 4 nm and less than or equal to about 50 nm, less than or equal to about 40 nm, less than or equal to about 30 nm, less than or equal to about 20 nm, less than or equal to about 15 nm, for example, less than or equal to about 10 nm. The shape of the luminescent nanostructure is not particularly limited. For example, the shape of the luminescent nanostructure may include, but is not limited to, a sphere, a polyhedron, a pyramid, a multi-pod, a square, a rectangular parallelepiped, a nanotube, a nanorod, a nanowire, a nanosheet, or a combination thereof. The luminescent nanostructures are commercially available or may be appropriately synthesized.

The luminescent nanostructure may include an organic ligand on its surface, and the organic ligand may include $RCOOH$, $RNH_2$, $R_2NH$, $R_3N$, $RSH$, $R_3PO$, $R_3P$, $ROH$, $RCOOR$, $RPO(OH)_2$, $RHPOOH$, $RHPOOH$, $R_2POOH$, or a combination thereof, wherein each R is independently a substituted or unsubstituted C1 to C40 aliphatic hydrocarbon group, a substituted or unsubstituted C6 to C20 aromatic hydrocarbon group, or a combination thereof.

An amount of the luminescent nanostructures in the ink composition may be greater than or equal to about 1 wt %, greater than or equal to about 3 wt %, greater than or equal to about 5 wt %, greater than or equal to about 7 wt %, greater than or equal to about 9 wt %, greater than or equal to about 11 wt %, greater than or equal to about 13 wt %, greater than or equal to about 15 wt %, greater than or equal to about 17 wt %, greater than or equal to about 19 wt %, greater than or equal to about 21 wt %, greater than or equal to about 23 wt %, greater than or equal to about 25 wt %, greater than or equal to about 27 wt %, greater than or equal to about 29 wt %, greater than or equal to about 31 wt %, greater than or equal to about 33 wt %, greater than or equal to about 35 wt %, greater than or equal to about 37 wt %, greater than or equal to about 39 wt %, greater than or equal to about 41 wt %, greater than or equal to about 43 wt %, greater than or equal to about 45 wt %, greater than or equal to about 47 wt %, or greater than or equal to about 49 wt %, based on the total solid content of the composition. An amount of the luminescent nanostructures in the ink composition may be less than or equal to about 80 wt %, less than or equal to about 73 wt %, less than or equal to about 71 wt %, less than or equal to about 69 wt %, less than or equal to about 67 wt %, less than or equal to about 65 wt %, less than or equal to about 63 wt %, less than or equal to about 61 wt %, less than or equal to about 59 wt %, less than or equal to about 57 wt %, less than or equal to about 55 wt %, less than or equal to about 53 wt %, less than or equal to about 51 wt %, less than or equal to about 49 wt %, less than or equal to about 47 wt %, less than or equal to about 45 wt %, less than or equal to about 43 wt %, less than or equal to about 41 wt %, less than or equal to about 39 wt %, less than or equal to about 37 wt %, less than or equal to about 35 wt %, less than or equal to about 33 wt %, less than or equal to about 31 wt %, or less than or equal to about 21 wt %, based on the total solid content of the composition.

In the ink composition of an embodiment, the (liquid) monomer may include a carbon-carbon double bond. The monomer may include a (mono or multi-functional) acrylate compound. The acrylate compound may include alkyl(meth)acrylate, ethylene glycol di(meth)acrylate, triethylene glycol di(meth)acrylate, diethylene glycol di(meth)acrylate, 1,4-butanediol di(meth)acrylate, 1,6-hexanediol di(meth)acrylate, neopentylglycol di(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol penta(meth)acrylate, pentaerythritol hexa(meth)acrylate, bisphenol A di(meth)acrylate, bisphenol A epoxy acrylate, trimethylolpropane tri(meth)acrylate, ethylene glycol monomethylether (meth)acrylate, novolac epoxy (meth)acrylate, diethylene glycol di(meth)acrylate, triethylene glycol di(meth)acrylate, propylene glycol di(meth)acrylate, tris (meth)acryloyloxy ethyl phosphate, or a combination thereof. In an embodiment, the monomer may include a di(meth)acrylate compound, a tri(meth)acrylate compound, a tetra(meth)acrylate compound, a penta(meth)acrylate compound, a hexa(meth)acrylate compound, or a combination thereof, but is not limited thereto.

In an embodiment, the monomer may include hexamethylene di(meth)acrylate, tetraethylene glycol di(meth)acrylate, dipropylene glycol di(meth)acrylate, tripropylene glycol di(meth)acrylate, triethylene glycol di(meth)acrylate, or a combination thereof.

In the ink composition, an amount of the liquid monomer may be greater than or equal to about 1 wt %, greater than or equal to about 5 wt %, greater than or equal to about 10 wt %, greater than or equal to about 15 wt %, greater than or equal to about 20 wt %, greater than or equal to about 25 wt %, greater than or equal to about 30 wt %, greater than or equal to about 35 wt %, or greater than or equal to about 40 wt %, based on the total solid content of the composition. In the ink composition, an amount of the liquid monomer may be less than or equal to about 70 wt %, less than or equal to about 75 wt %, less than or equal to about 74 wt %, less than or equal to about 70 wt %, less than or equal to about 60 wt %, less than or equal to about 55 wt %, less than or equal to about 50 wt %, less than or equal to about 45 wt %, less than or equal to about 40 wt %, less than or equal to about 35 wt %, less than or equal to about 30 wt %, less than or equal to about 25 wt %, less than or equal to about 20 wt %, or less than or equal to about 15 wt %, based on the total solid content of the composition.

The ink composition of an embodiment may further include an initiator according to selection. In the ink composition, the initiator may be a compound capable of initiating polymerization (e.g., radical polymerization) of the aforementioned monomer or the like by energy (e.g., heat or light). The initiator may include a thermal initiator and/or a photoinitiator. Types of the thermal initiator may include azobisisobutyronitrile, and the like, but are not limited thereto. The photoinitiator may include a triazine-based compound, an acetophenone compound, a benzophenone compound, a thioxanthone compound, a benzoin compound, an oxime ester compound, an aminoketone compound, a phosphine or phosphineoxide compound, a carbazole-based compound, a diketone compound, a sulfonium borate-based compound, a diazo-based compound, a bisimidazole-based compound, or a combination thereof, but is not limited thereto. The type of each of the aforementioned initiator is known and is not particularly limited. In the ink composition, an amount of the initiator may be greater than or equal to about 0.1 wt %, greater than or equal to about 0.5 wt %, greater than or equal to about 1 wt %, greater than or equal to about 1.5 wt %, greater than or equal to about 2 wt %, greater than or equal to about 2.5 wt %, or greater than or equal to about 3 wt % based on the total solid content of the composition. In the ink composition, an amount of the initiator may be less than or equal to about 10 wt %, less than or equal to about 5 wt %, less than or equal to about 4 wt %, less than or equal to about 3 wt %, less than or equal to about 2 wt %, less than or equal to about 1 wt %, or less than or equal to about 0.5 wt % based on the total solid content of the composition.

The ink composition may further include a leveling agent, a dispersing agent, and other additives. The leveling agent prevents stains or spots and improves leveling characteristics, and specific examples may be follows without limitation. An amount of the additive is not particularly limited and may be controlled within an appropriate range wherein the additive does not cause an adverse effect on the ink composition and the pattern obtained therefrom. For example, if it is present, an amount of the additive may be greater than or equal to about 0.5 wt % and less than or equal to about 10 wt % based on the total weight of a solid content but is not limited thereto. The type and content of the additive may be adjusted as necessary.

The ink composition may have a viscosity at a temperature of 25° C. of greater than or equal to about 5 centipoise (cPs), greater than or equal to about 7 cPs, greater than or equal to about 9 cPs, greater than or equal to about 11 cPs, greater than or equal to about 13 cPs, greater than or equal to about 15 cPs, greater than or equal to about 17 cPs, greater than or equal to about 19 cPs, greater than or equal to about 21 cPs, greater than or equal to about 23 cPs, or greater than or equal to about 25 cPs. The ink composition may have a viscosity at a temperature of 25° C. of less than or equal to about 35 cPs, less than or equal to about 33 cPs, less than or equal to about 31 cPs, less than or equal to about 29 cPs, less than or equal to about 27 cPs, less than or equal to about 20 cPs, less than or equal to about 17 cPs, less than or equal to about 15 cPs, less than or equal to about 13 cPs, less than or equal to about 11 cPs, or less than or equal to about 9 cPs. The ink composition may have a viscosity at a temperature of 25° C. of less than or equal to about 100 cPs, less than or equal to about 90 cPs, less than or equal to about 80 cPs, less than or equal to about 70 cPs, less than or equal to about 60 cPs, less than or equal to about 50 cPs, less than or equal to about 40 cPs, less than or equal to about 30 cPs, or less than or equal to about 20 cPs, or a combination thereof.

The ink composition does not contain a carboxylic acid group-containing binder polymer having an acid value of greater than or equal to about 50 mg KOH/g, or a thiol compound (e.g., a polythiol compound such as a dithiol or trithiol compound) having at least one, two or more thiol group(s) for example its terminal end.

The ink composition may have a vapor pressure at 20° C. of less than or equal to about 1 mmHg, less than or equal to about $5\times10^{-1}$ mmHg, less than or equal to about $10^{-1}$ mmHg, or less than or equal to about $5\times10^{-2}$ mmHg, or less than or equal to about $10^{-2}$ mmHg.

The ink composition may have a boiling point of greater than or equal to about 190° C., greater than or equal to about 200° C., or greater than or equal to about 210° C., greater than or equal to about 230° C., greater than or equal to about 240° C., greater than or equal to about 250° C., greater than or equal to about 260° C., greater than or equal to about 270° C., or greater than or equal to about 280° C. The ink composition may have a boiling point of less than or equal to about 350° C., less than or equal to about 320° C., less than or equal to about 310° C., less than or equal to about 300° C., less than or equal to about 290° C., less than or equal to about 280° C., less than or equal to about 250° C., or less than or equal to about 230° C.

The ink composition may exhibit improved dispersibility, e.g., improved dispersibility of the titanium oxide particles and/or the nanostructures. The ink composition may have an average particle size of less than or equal to about 2 micrometers (pm), less than or equal to about 1.5 μm, less than or equal to about 1 μm, or less than or equal to about 900 nm, as confirmed by dynamic light scattering (DLS) analysis. The ink composition may exhibit colloidal dispersibility.

Another embodiment provides a method of producing a pattern including a luminescent nanostructure composite. The method of producing the pattern includes depositing the aforementioned composition on a substrate through a droplet discharging device to form a patterned film; and performing polymerization of (or polymerizing) the monomers. Referring to FIG. 10, a method of an embodiment may include providing an ink composition, providing a substrate (e.g., in which pixel area is patterned by an electrode and optionally, a bank(s), etc.); depositing the ink composition on the substrate (or the pixel area) to provide, for example, a first quantum dot layer (or first region). The method may further include depositing an ink composition on the substrate (or the pixel area) to provide, for example, a second quantum dot layer (or second region). The forming a first quantum dot layer and the forming a second quantum dot layer are simultaneously or sequentially carried out.

The depositing an ink composition may be performed using an appropriate liquid crystal discharger such as an Inkjet or nozzle printing system (e.g., having an ink storage and at least one print head). The deposited ink composition may provide a (first or second) quantum dot layer through the solvent removal and polymerization by the heating. The method may provide a highly precise quantum dot-polymer composite film or patterned film over a relatively short time, and thereby, provide an efficient production of the composite. The composition of an embodiment may not include a volatile organic solvent, and thus, the method may not include (or may exclude) removing a volatile organic material as a step in the print process.

Another embodiment provides a luminescent nanostructure composite, the composite includes, a matrix and a plurality of luminescent nanostructures and titanium oxide particles dispersed in the matrix.

The matrix may include a polymer obtained by polymerizing the above monomers. The titanium oxide particles have an average size of greater than or equal to about 10 nm and less than or equal to about 900 nm and include an organosilane compound bonded to the surface. The titanium oxide particles may further include aluminum. In the titanium oxide particles, an amount of the aluminum may be greater than or equal to about 0.1 wt % or more and less than or equal to about 10 wt % based on the total weight of the titanium oxide.

Contents of the plurality of luminescent nanostructures, the titanium oxide particles, and the like are as described above. An amount of each component based on the solid content may be that in a composite.

A quantum dot composite (a film or a pattern) obtained from the ink composition of an embodiment may be used in a color conversion panel and a display panel including the composite. In an embodiment, the color conversion panel includes a color conversion layer (e.g., disposed on a substrate) including a color conversion region and optionally, partition walls defining each region of the color conversion layer.

The color conversion region includes a first region configured to emit first light, and the first region includes the aforementioned luminescent nanostructure composite (hereinafter, referred to as a quantum dot composite). The color conversion region may further include a second region emitting second light differing from the first light and including the quantum dot composite.

The first light and the second light may exhibit a different maximum emission peak wavelength in the photoluminescence spectrum. In an embodiment, the first light may be red light having a maximum emission peak wavelength in a range of about 600 nm to about 670 nm (e.g., about 620 nm to about 650 nm), and the second light may be green light having a maximum emission peak wavelength in a range of about 500 nm to about 580 nm (e.g., about 500 nm to about 550 nm).

In an embodiment, an electronic device or a display device (e.g., a display panel) may further include the color conversion panel and optionally, a light source. In an embodiment, the display panel includes a light emitting panel (or a light source), a color conversion panel, and a light transmitting layer between the light emitting panel and the color conversion panel. The color conversion panel may include a substrate, and the color conversion layer may be disposed on the substrate.

The light source or the light emitting panel (if present) may be configured to provide the color conversion panel (or the color conversion layer) with incident light. The incident light may have a luminescence peak wavelength of greater than or equal to about 440 nm, for example, greater than or equal to about 450 nm and less than or equal to about 580 nm, for example, less than or equal to about 480 nm, less than or equal to about 470 nm, or less than or equal to about 460 nm.

In one embodiment, the color conversion panel or the color conversion layer (or a photoluminescence type device) may include a sheet of the quantum dot composite. The color conversion panel or the photoluminescence type device may include a backlight unit 410 and a liquid crystal panel 420, and the backlight unit 410 may include a quantum dot polymer composite sheet (QD sheet). In an embodiment, the backlight unit 410 may include a reflector, a light guide plate (LGP), a light source (blue LED, etc.), a quantum dot polymer composite sheet (QD sheet), and optical films (prism, double brightness enhance film, DBEF, etc.) and the like). The liquid crystal panel 420 is disposed on the backlight unit 410 and may have a structure including a liquid crystal and a color filter between two polarizers (Pol). The quantum dot polymer composite sheet (QD sheet) may include quantum dots emitting red light and quantum dots emitting green light by absorbing light from a light source. Blue light from the light source may be combined with red light and green light emitted from quantum dots and converted to white light by passing through the quantum dot polymer composite sheet. The white light may be separated to blue light, green light, and red light by a color filter in the liquid crystal panel and may be emitted to the outside in each pixel.

The color conversion panel may include the substrate, and the color conversion layer may be disposed on the substrate.

The color conversion layer or the color conversion panel may include a patterned film of the quantum dot composite. The patterned film includes repeating sections configured to emit desired light. The first partition may be a red light emitting section. The second partition may be a green light emitting section. The third section may be a section emitting or transmitting blue light. Details of the first, second, and third sections are as described above.

The light emitting panel or the light source may be an element emitting incident light. The incident light may include blue light and optionally, green light. The light source may include an LED. The light source may include an organic LED (OLED). On a front surface (a light emitting surface) of the first and/or second section, an optical element blocking (e.g., reflecting or absorbing) blue light (and optionally, green light), for example, a blue light (and optionally, green light)-blocking film or a first optical filter, which is described herein, may be disposed. When the light source includes a blue light-emitting organic light emitting diode (OLED) and a green light-emitting organic light emitting diode (OLED), a green light removing filter may be further disposed on the third section transmitting blue light.

The light emitting panel or the light source may include a plurality of light emitting units respectively corresponding to the first section and the second section, and the light emitting units may include a first electrode and a second electrode and an (organic) electroluminescent layer disposed between the first electrode and the second electrode. The electroluminescent layer may include an organic light emitting material. For example, each light emitting unit of the light source may include an electroluminescent device (e.g., an organic light emitting diode (OLED)) configured to emit light of a predetermined wavelength (e.g., blue light, green light, or a combination thereof). Structures and materials of the electroluminescent device and the organic light emitting diode (OLED) are well known but not particularly limited thereto.

Hereinafter, the display panel and the color conversion panel are described in more detail with reference to the drawings.

Figure 2:
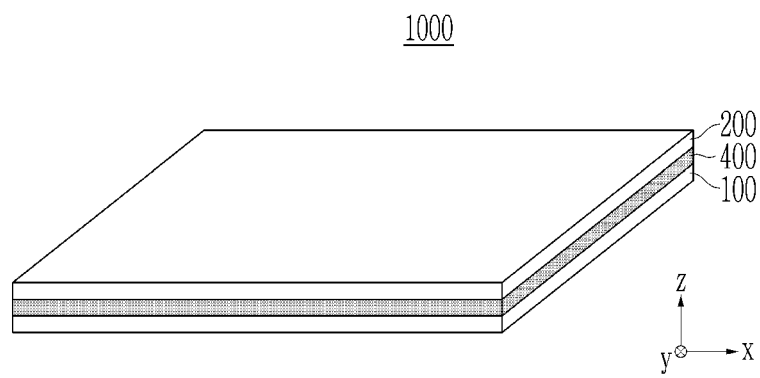
FIG. 2 is a perspective view illustrating an example of a display panel according to an exemplary embodiment.
Figure 3:
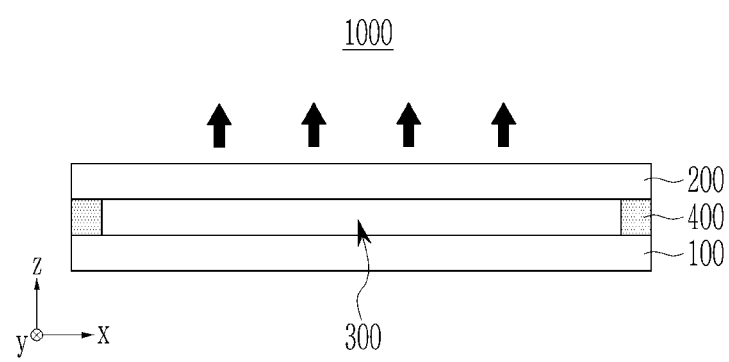
FIG. 3 is a cross-sectional view of the display panel of FIG. 2.

Referring to FIGS. 2 and 3, a display panel 1000 according to an embodiment includes a light emitting panel 100, a color conversion panel 200, a light transmitting layer 300 disposed between the light emitting panel 100 and the color conversion panel 200, and a binder 400 bonding the light emitting panel 100 and the color conversion panel 200. In FIG. 3, the arrows depict the direction of light emitted from the panel 1000.

The light emitting panel 100 and the color conversion panel 200 may face each other with the light transmitting layer 300 therebetween, and the color conversion panel 200 may be disposed in a direction in which light is emitted from the light emitting panel 100. The binder 400 may be disposed along the edges of the light emitting panel 100 and the color conversion panel 200, and may be, for example, a sealant.

Figure 4:
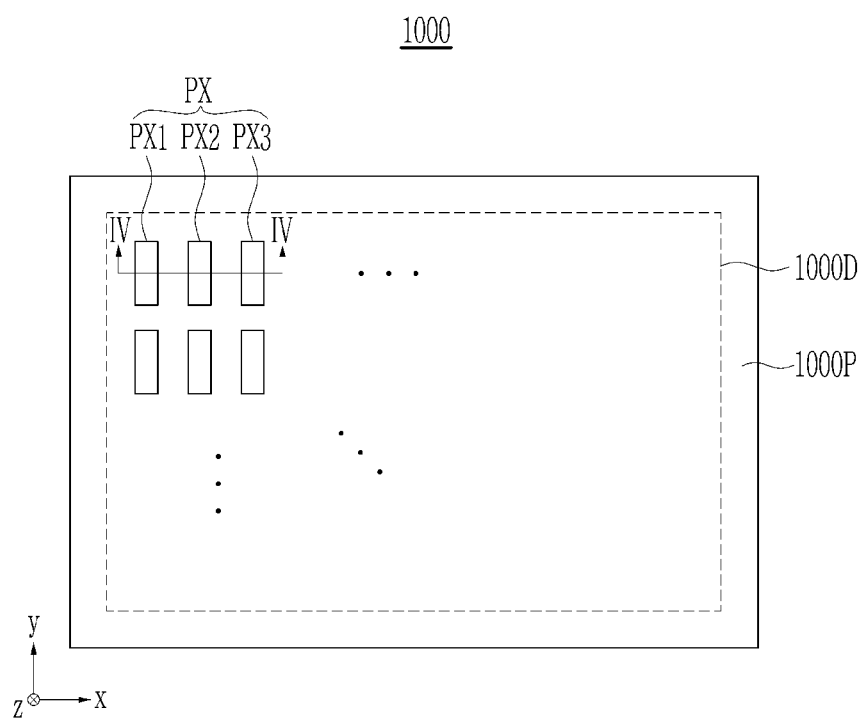
FIG. 4 is a plan view illustrating an example of a pixel arrangement of the display panel of FIG. 2.

Referring to FIG. 4, a display panel 1000 according to an embodiment includes a display area 1000D for displaying an image and a non-display area 1000P disposed around the display area 1000D and in which the binding element 400 is disposed.

The display area 1000D may include a plurality of pixels PXs arranged along a row (e.g., x direction) and/or a column (e.g., y direction), and each pixel PX may include a plurality of sub-pixels $PX_1$, $PX_2$, and $PX_3$ displaying different colors. Herein, as an example, a configuration in which three sub-pixels $PX_1$, $PX_2$, and $PX_3$ constitute one pixel PX is illustrated, but the configuration is not limited thereto. An additional sub-pixel such as a white sub-pixel may be further included, and one or more sub-pixels displaying the same color may be included. The plurality of pixels PXs may be arranged in, for example, a Bayer matrix, a PenTile matrix, and/or a diamond matrix, but is not limited thereto.

Each of the sub-pixels $PX_1$, $PX_2$, and $PX_3$ may be configured to display a color of three primary colors or a combination of three primary colors, for example, red, green, blue, or a combination thereof. For example, the first sub-pixel $PX_1$ may be configured to display red, the second sub-pixel $PX_2$ may be configured to display green, and the third sub-pixel $PX_3$ may be configured to display blue.

In the drawing, an example in which all sub-pixels have the same size is illustrated, but the present disclosure is not limited thereto. At least one of the sub-pixels may be larger or smaller than the other sub-pixels. In the drawing, an example in which all sub-pixels have the same shape is illustrated, but the present disclosure is not limited thereto. At least one of the sub-pixels may have a different shape from other sub-pixels.

Figure 5:
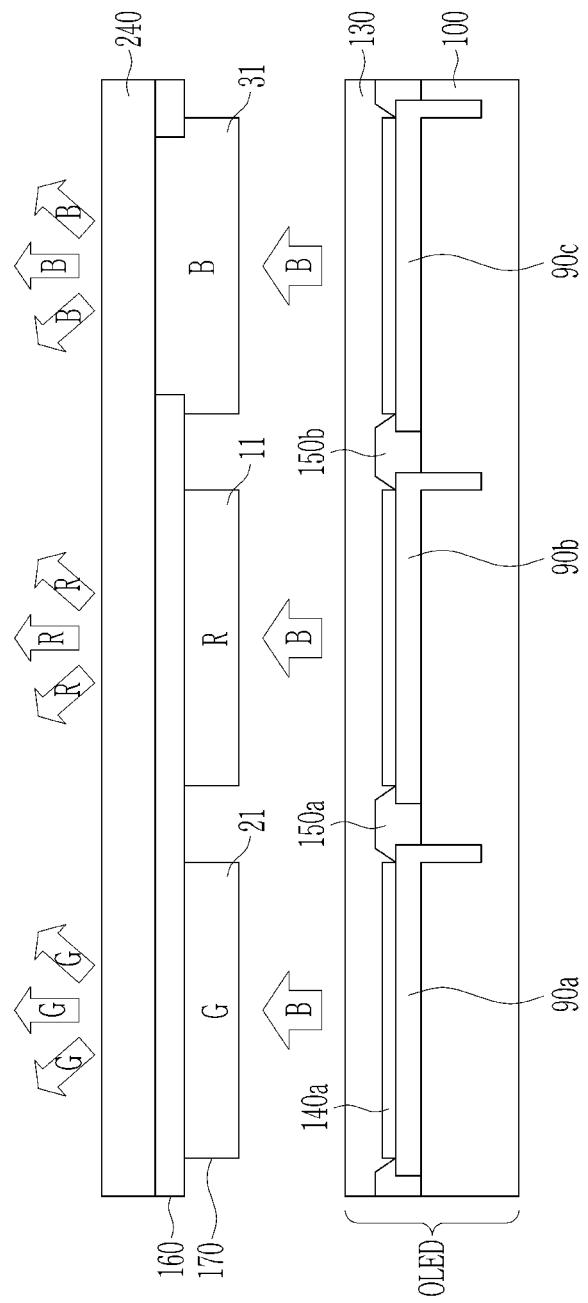
FIG. 5 is a cross-sectional view of the display panel of FIG. 4 taken along line IV-IV.
Figure 6:
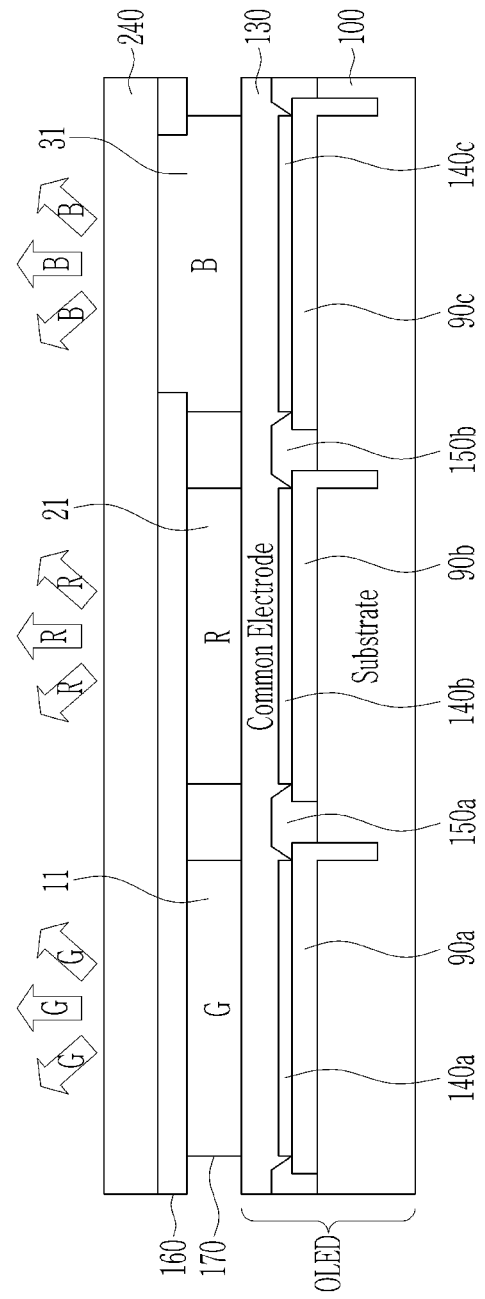
FIG. 6 is a cross-sectional view of a display panel according to another embodiment.

FIGS. 5 and 6 show schematic cross-sectional views of a device (or a display panel) according to an embodiment. Referring to FIGS. 5 and 6, a light source (or a light emitting panel) may include an organic light emitting diode (OLED) emitting blue light (and optionally, green light). The organic light emitting diode (OLED) may include at least two pixel electrodes 90a, 90b, 90c formed on the substrate 100, a pixel define layer 150a, 150b formed between the adjacent pixel electrodes 90a, 90b, 90c, an organic light emitting layer 140a, 140b, 140c formed on each pixel electrode 90a, 90b, 90c, and a common electrode layer 130 formed on the organic light emitting layer 140a, 140b, 140c. Under the organic light emitting diode (OLED), a thin film transistor and a substrate may be disposed. Pixel areas of OLED may be disposed to correspond to the first, second, and third sections, which will be described later.

On the light source, a stacking structure including a pattern (e.g., the first section including a red quantum dot and the second section including a green quantum dot) of the quantum dot composite and a substrate may be disposed. Blue light emitted from the light source is incident onto the first section and the second section and respectively emitted as red and green light. The blue light emitted from the light source may pass the third section. An excitation light-blocking element (a first optical filter or an incident light blocking layer) may be optionally disposed between the quantum dot composite layer (R, G) and the substrate. When the incident light includes blue light and green light, a green light-blocking filter may be added in the third section. The first optical filter or the incident light blocking layer will be described in more detail below.

This device may be manufactured by separately manufacturing the aforementioned color conversion panel and LED or OLED (e.g., emitting blue light and optionally, green light) and combining them. Alternatively, the device may be manufactured by directly forming a pattern of the quantum dot composite on the LED or OLED.

The substrate may be a substrate including an insulation material. The substrate may include glass; polyester such as polyethylene terephthalate (PET), polyethylene naphthalate (PEN), and the like, various polymers such as polycarbonate, polyacrylate, and the like; polysiloxane (e.g., polydimethylsiloxane (PDMS)); an inorganic material such as $Al_2O_3$, ZnO, and the like; or a combination thereof but is not limited thereto. The substrate may have an appropriate thickness selected in consideration of the substrate materials and the like, but is not particularly limited thereto. The substrate may have flexibility. The substrate may be configured to have transmittance of greater than or equal to about 50%, greater than or equal to about 60%, greater than or equal to about 70%, greater than or equal to about 80%, or greater than or equal to about 90% with respect to light emitted from the quantum dots.

On the substrate, a wiring layer including the thin film transistor and the like is formed. The wiring layer may further include a gate line, a sustain voltage line, a gate insulating layer, a data line, a source electrode, a drain electrode, a semiconductor, a protective layer, and the like. The wiring layer may have specifically various structures according to embodiments. The gate line and the sustain voltage are electrically isolated, and the data line insulates and crosses the gate line and the sustain voltage. The gate electrode, the source electrode, and the drain electrode respectively constitute a control terminal, an input terminal, and an output terminal of the thin film transistor. The drain electrode is electrically connected to the pixel electrode which will be described later.

The pixel electrode may act as an electrode (e.g., anode) of a display device. The pixel electrode may be formed of a transparent conductive material such as indium tin oxide (ITO) or indium zinc oxide (IZO). The pixel electrode may be formed of a material having light-blocking properties such as gold (Au), platinum (Pt), nickel (Ni), tungsten (W), chromium (Cr), molybdenum (Mo), iron (Fe), cobalt (Co), copper (Cu), palladium (Pd), titanium (Ti), and the like. The pixel electrode may have a two-layered structure in which the aforementioned transparent conductive material and the aforementioned light-blocking material are sequentially stacked.

Between two neighboring pixel electrodes, a pixel define layer (PDL) may be formed to overlap with an end of the pixel electrode to divide the pixel electrode in a unit of pixels. The pixel define layer may be an insulating layer and electrically block the two or more pixel electrodes.

The pixel define layer may cover only a portion of an upper surface of the pixel electrode, so that the remaining portion of the pixel electrode not converted with the pixel define layer may form an opening. On an area defined by the opening, the organic light emitting layer, which will be described later, may be formed.

The organic light emitting layer is defined as each pixel area by the aforementioned pixel electrode and the pixel define layer. In other words, one pixel area may be defined as an area where one organic light emitting unit layer is formed in contact with one pixel electrode divided by the pixel define layer. In a display device according to an embodiment, the organic light emitting layer may be defined by a first pixel area, a second pixel area, and a third pixel area, and each pixel area is spaced apart with a predetermined interval by the pixel define layer.

The organic light emitting layer may emit third light belonging to a visible light region or a UV region. Each first to third pixel area of the organic light emitting layer all may emit third light. In an embodiment, the third light may include light having the highest energy in the visible light region, for example, blue light (and optionally, green light). When all of the pixel areas of the organic light emitting layer are designed to emit the same light, each pixel area of the organic light emitting layer may be formed of the same or similar material or exhibit the same or similar properties. Accordingly, since process difficulty of forming the organic light emitting layer may be greatly reduced, such a display device may be easily applied to a large-scale/large area process. However, the organic light emitting layer according to an embodiment is not necessarily limited thereto but may be set to emit two or more different light.

The organic light emitting layer includes an organic light emitting unit layer for each pixel area, and each organic light emitting unit layer may further include an auxiliary layer (e.g., a hole injection layer (HIL), a hole transport layer (HTL), an electron transport layer (ETL), and the like) in addition to the light emitting layer.

The common electrode may work as a cathode of the display device. The common electrode may be formed of a transparent conductive material such as indium tin oxide (ITO) or indium zinc oxide (IZO). The common electrode may be integrally formed on the organic light emitting layer.

A planarization layer or a passivation layer (not shown) may be formed on the common electrode. The planarization layer may include a (e.g., transparent) insulating material in order to secure electrical insulation property with the common electrode.

In an embodiment, the display device may further include a lower substrate, a polarizing plate disposed under the lower substrate, and a liquid crystal layer disposed between the stacked structure and the lower substrate, and in the stacked structure, the photoluminescent layer may be disposed to face the liquid crystal layer. The display device may further include a polarizing plate between the liquid crystal layer and the photoluminescent layer. The light source may further include LED and if necessary, a light guide plate.

Figure 7:
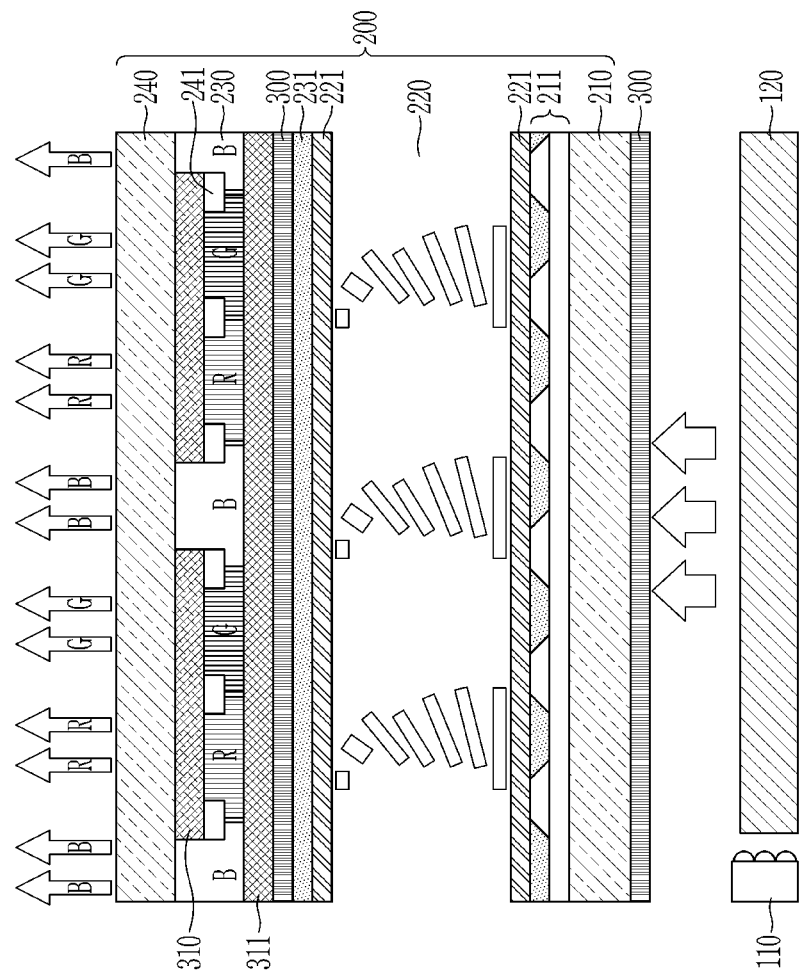
FIG. 7 is a schematic cross-sectional view of a display device according to an embodiment.

Non-limiting examples of the display device (e.g., a liquid crystal display device) according to an embodiment are illustrated with a reference to a drawing. FIG. 7 is a schematic cross-sectional view showing a liquid crystal display according to an embodiment. Referring to FIG. 7, the display device of an embodiment includes a liquid crystal panel 200, a polarizing plate 300 disposed under the liquid crystal panel 200, and a backlight unit (BLU, 110/120) disposed under the polarizing plate 300.

The liquid crystal panel 200 includes a lower substrate 210, a stack structure, and a liquid crystal layer 220 disposed between the stack structure and the lower substrate. The stacked structure includes a transparent substrate 240 and a photoluminescent layer 230 including a pattern of a quantum dot polymer composite.

The lower substrate 210 referred to as an array substrate may be a transparent insulation material substrate. The substrate is the same as described above. A wire plate 211 is provided on an upper surface of the lower substrate 210. The wire plate 211 may include a plurality of gate wires (not shown) and data wires (not shown) that define a pixel area, a thin film transistor disposed adjacent to a crossing region of gate wires and data wires, and a pixel electrode for each pixel area, but is not limited thereto. Details of such a wire plate are known and are not particularly limited.

A liquid crystal layer 220 is provided on the wiring plate 211. The liquid crystal layer 220 may include an alignment layer 221 on and under the layer 220 to initially align the liquid crystal material included therein. Details (e.g., a liquid crystal material, an alignment layer material, a method of forming liquid crystal layer, a thickness of liquid crystal layer, or the like) of the liquid crystal material and the alignment layer are known and are not particularly limited.

A lower polarizing plate 300 is provided under the lower substrate. Materials and structures of the polarizing plate 300 are known and are not particularly limited. A backlight unit (e.g., emitting blue light) may be disposed under the polarizing plate 300. An upper optical device or the polarizing plate 300 may be provided between the liquid crystal layer 220 and the transparent substrate 240, but is not limited thereto. For example, the upper polarizing plate may be disposed between the liquid crystal layer 220 and the photoluminescent layer 230. The polarizing plate may be any polarizer that used in a liquid crystal display device. The polarizing plate may be TAC (triacetyl cellulose) having a thickness of less than or equal to about 200 μm, but is not limited thereto. In another embodiment, the upper optical device may be a coating that controls a refractive index without a polarization function.

The backlight unit includes a light source 110. The light source may emit blue light or white light. The light source may include a blue LED, a white LED, a white OLED, or a combination thereof, but is not limited thereto.

The backlight unit may further include a light guide plate 120. In an embodiment, the backlight unit may be an edge-type lighting. For example, the backlight unit may include a reflector (not shown), a light guide plate (not shown) provided on the reflector and providing a planar light source with the liquid crystal panel 200, and/or at least one optical sheet (not shown) on the light guide plate, for example, a diffusion plate, a prism sheet, and the like, but is not limited thereto. The backlight unit may not include a light guide plate. In an embodiment, the backlight unit may be a direct lighting. For example, the backlight unit may have a reflector (not shown) and may have a plurality of fluorescent lamps disposed on the reflector at regular intervals, or may have an LED operating substrate on which a plurality of light emitting diodes may be disposed, a diffusion plate thereon, and optionally at least one optical sheet. Details (e.g., each component of a light emitting diode, a fluorescent lamp, a light guide plate, various optical sheets, and a reflector) of such a backlight unit are known and are not particularly limited.

A black matrix 241 is provided under the transparent substrate 240 and has openings and hides a gate line, a data line, and a thin film transistor of the wire plate on the lower substrate. For example, the black matrix 241 may have a grid shape. The photoluminescent layer 230 is provided in the openings of the black matrix 241 and has a quantum dot-polymer composite pattern including a first section (R) configured to emit first light (e.g., red light), a second section (G) configured to emit second light (e.g., green light), and a third section (B) configured to emit/transmit, for example blue light. If needed, the photoluminescent layer may further include at least one fourth section. The fourth section may include a quantum dot that emits different color from light emitted from the first to third sections (e.g., cyan, magenta, and yellow light). In the photoluminescent layer 230, sections forming the pattern may be repeated corresponding to pixel areas formed on the lower substrate. A transparent common electrode 231 may be provided on the photoluminescent type color filter layer.

In the photoluminescent layer 230, sections forming the pattern may be repeated corresponding to pixel areas formed on the lower substrate. In this case, blue light emitted from the backlight unit may enter in a polarized state and may be emitted through the polarizing plate and the liquid crystal layer as it is. If needed, the third section may include a quantum dot emitting blue light.

As described above, if desired, the display device or the light emitting device according to an embodiment may further include an incident light blocking layer or a first optical filter layer 310 (hereinafter, referred to as a first optical filter layer). The first optical filter layer may be disposed between the bottom surfaces of the first section (R) and the second section (G) and the substrate (e.g., the upper substrate 240) or on the upper surface of the substrate. The first optical filter layer 310 may be a sheet having an opening in a portion corresponding to a pixel region (third section) displaying blue, and thus may be formed in portions corresponding to the first and second sections. In an embodiment, the first optical filter layer may be integrally formed at positions other than the position overlapped with the third section as shown in FIGS. 5-7 but the present disclosure is not limited thereto. In an embodiment, the first optical filter layer may be disposed on the third section. In addition, two or more (e.g., three) first optical filter layers may be spaced apart from each other at positions overlapped with the first and second sections, and optionally, the third section. When the light source includes a green light emitting element, a green light blocking layer may be disposed on the third section.

The first optical filter layer may block light having, for example, a predetermined wavelength region in the visible light region and may transmit light in the other wavelength regions, and for example, it may block blue light (or green light) and may transmit light except the blue light (or green light). The first optical filter layer may transmit, for example, green light, red light, and/or yellow light which is a mixed color thereof. The first optical filter layer may transmit blue light and block green light and may be disposed on the blue light emitting pixel.

The first optical filter layer may substantially block incident light and transmit light in a desired wavelength range. The transmittance of the first optical filter layer for the light in a desired wavelength range may be greater than or equal to about 70%, greater than or equal to about 80%, greater than or equal to about 90%, or even about 100%.

The first optical filter layer configured to selectively transmit red light may be disposed at a position overlapped with the red light emitting section, and the first optical filter layer configured to selectively transmit green light may be disposed at a position overlapped with the green light emitting section. The first optical filter layer may include at least one of a first region that blocks (e.g., absorbs) blue light and red light and selectively transmits light of a predetermined range (e.g., greater than or equal to about 500 nm, greater than or equal to about 510 nm, or greater than or equal to about 515 nm and less than or equal to about 550 nm, less than or equal to about 545 nm, less than or equal to about 540 nm, less than or equal to about 535 nm, less than or equal to about 530 nm, less than or equal to about 525 nm, or less than or equal to about 520 nm) and a second region that blocks (e.g., absorb) blue light and green light and selectively transmits light of a predetermined range (e.g., greater than or equal to about 600 nm, greater than or equal to about 610 nm, or greater than or equal to about 615 nm and less than or equal to about 650 nm, less than or equal to about 645 nm, less than or equal to about 640 nm, less than or equal to about 635 nm, less than or equal to about 630 nm, less than or equal to about 625 nm, or less than or equal to about 620 nm). When the light source emits blue and green mixed light, the first optical filter may further include a third region that selectively transmits blue light and blocks green light.

The first region may be disposed at a position overlapped with the green light emitting section. The second region may be disposed at a position overlapped with the red light emitting section. The third region may be disposed at a position overlapped with the blue light emitting section.

The first region, the second region, and, optionally, the third region may be optically isolated. Such a first optical filter layer may contribute to improvement of color purity of the display device.

The display device may further include a second optical filter layer (e.g., recycling layer of red/green light or yellow light) that is disposed between the photoluminescent layer and the liquid crystal layer (e.g., between the photoluminescent layer and the upper polarizer), transmits at least a portion of the third light (excitation light), and reflects at least a portion of the first light and/or the second light. The first light may be red light, the second light may be green light, and the third light may be blue light. The second optical filter layer may transmit only the third light (B) in a blue light wavelength region having a wavelength region of less than or equal to about 500 nm and light in a wavelength region of greater than about 500 nm, which is green light (G), yellow light, red light (R), or the like, may be not passed through the second optical filter layer and reflected. The reflected green light and red light may pass through the first and second sections and to be emitted to the outside of the display device.

The second optical filter layer or the first optical filter layer may be formed as an integrated layer having a relatively planar surface.

The first optical filter layer may include a polymer thin film including a dye and/or a pigment absorbing light in a wavelength which is to be blocked. The second optical filter layer and the first optical filter layer may include a single layer having a low refractive index, and may be, for example, a transparent thin film having a refractive index of less than or equal to about 1.4, less than or equal to about 1.3, or less than or equal to about 1.2. The second optical filter layer or the first optical filter layer having a low refractive index may be, for example, a porous silicon oxide, a porous organic material, a porous organic/inorganic composite, or a combination thereof.

The first optical filter layer or the second optical filter layer may include a plurality of layers having different refractive indexes. It may be formed by stacking two layers having different refractive indexes. For example, the first/second optical filter layer may be formed by alternately stacking a material having a high refractive index and a material having a low refractive index.

The aforementioned composite, color conversion panel, or display panel may be included in an electronic device. Such an electronic device may include, but are not limited to, a display device, a light emitting diode (LED), an organic light emitting diode (OLED), a quantum dot LED, a sensor, a solar cell, an imaging sensor, a photodetector, or a liquid crystal display device. The aforementioned composite, color conversion panel, or display panel may be included in an electronic device. Such an electronic device may include a portable terminal device, a monitor, a notebook PC, a television, an electronic display, a camera, an automobile, and the like, but are not limited thereto. Such an electronic device may include a portable terminal device, a monitor, a notebook PC, a television, an electronic display, a camera, an automobile, and the like, but are not limited thereto. The electronic device may be a camera or a portable terminal device including an image sensor including quantum dots. The electronic device may be a camera or a vehicle including a photodetector including quantum dots.

The luminescent structure (quantum dot) composite of an embodiment may exhibit a desired level of optical properties (e.g., a light conversion rate of greater than or equal to about 33%, greater than or equal to about 34%, or greater than or equal to about 35% and incident light (blue light) absorbance of greater than or equal to about 80%.

In a particle size analysis, the ink composition including the luminescent nanostructures of an embodiment may show a D50 (or D(50)) of less than or equal to about 190 nm, less than or equal to about 180 nm, less than or equal to about 170 nm, less than or equal to about 160 nm, less than or equal to about 155 nm, less than or equal to about 150 nm, less than or equal to about 145 nm, less than or equal to about 140 nm, or less than or equal to about 135 nm. In a particle size analysis, the ink composition including the luminescent structures of an embodiment may have a D50 of greater than or equal to about 100 nm, greater than or equal to about 110 nm, greater than or equal to about 120 nm, greater than or equal to about 140 nm, or greater than or equal to about 150 nm in particle size analysis. In a particle size analysis, the ink composition including the luminescent nanostructure of an embodiment may show a D90 (or D(90)) of less than or equal to about 210 nm, less than or equal to about 209 nm, less than or equal to about 208 nm, less than or equal to about 207 nm, less than or equal to about 206 nm, less than or equal to about 205 nm, less than or equal to about 204 nm, less than or equal to about 203 nm, less than or equal to about 202 nm, less than or equal to about 201 nm, less than or equal to about 200 nm, or less than or equal to about 195 nm. In a particle size analysis, the ink composition including the luminescent nanostructure of an embodiment may show a D90 (or D(90)) of greater than or equal to about 100 nm, greater than or equal to about 150 nm, or greater than or equal to about 180 nm.

In a particle size analysis, the dispersion containing the titanium oxide particles of an embodiment may show a D50 of less than or equal to about 190 nm, less than or equal to about 180 nm, less than or equal to about 170 nm, less than or equal to about 160 nm, less than or equal to about 155 nm, less than or equal to about 150 nm, less than or equal to about 145 nm, less than or equal to about 140 nm, or less than or equal to about 135 nm in particle size analysis. In a particle size analysis, the dispersion containing the titanium oxide particles of an embodiment may show a D50 of greater than or equal to about 100 nm, greater than or equal to about 110 nm, greater than or equal to about 120 nm, greater than or equal to about 140 nm, greater than or equal to about 145 nm, or greater than or equal to about 150 nm in particle size analysis. In a particle size analysis, the dispersion containing the titanium oxide particles of an embodiment may show a D90 of less than or equal to about 180 nm, less than or equal to about 170 nm, less than or equal to about 165 nm, or less than or equal to about 160 nm in particle size analysis. In a particle size analysis, the dispersion containing the titanium oxide particles of an embodiment may show a D90 of greater than or equal to about 100 nm, greater than or equal to about 130 nm, or greater than or equal to about 150 nm in particle size analysis.

Hereinafter, the embodiments are illustrated in more detail with reference to examples. However, they are exemplary examples of the present disclosure, and the present disclosure is not limited thereto.

EXAMPLES

Manufacture of Surface-treated Titanium Oxide and Characteristic Analysis

[1] $TIO_2$ particles are mixed with a mixed solvent of oleic acid and hexane and then, first ball-milled to provide a liquid particle mixture. 3 g of an organosilane compound (PEG) solution A and 1.1 g of a mixed solution of acetic acid +water (a mixing ratio of 75:31, wt:wt) are added to/mixed with the liquid particle mixture and then, ball-milled again. The $TiO_2$ particles from the treated dispersion thus obtained is recovered and separated/purified. The resulting powder is kept at a temperature of 100° C. for 14 hours for drying and then is ground.

[2] The titanium oxide before (for comparison) and after the surface treatment is dispersed in PGMEA, respectively, and for each dispersion, a zeta potential is measured by using a zeta potential analyzer. The zeta potential of the titanium oxide before the surface treatment is (−) 30 mV to −80 mV, and the zeta potential of the titanium oxide after the surface treatment is +10 mV to +70 mV (e.g., +20 mV to +40 mV).

[3] 0.9 g of the titanium oxide particles before and after the surface treatment is dispersed in a medium containing 29.1 g of an acrylate monomer to obtain dispersions, respectively, each of which is then applied on a glass substrate and a SUS substrate. After 24 hours, each of the applied substrate is subjected to air-blowing and prior to and after the air blowing, a contact angle of each substrate is measured to find out a surface energy change. The results are shown in Table 1.

TABLE 1

| | dispersion | Surface energy (dyn/cm) | | | |
|---|---|---|---|---|---|
| | | applied on glass | surface energy difference between application and removal on glass) | applied on SUS | surface energy difference between application and removal on SUS) |
| Ref. | not used | 75 | — | 30 | — |
| Comp. Example | before surface treatment | 42 | 33 | 42 | 12 |
| Example | after surface treatment | 44 | 31 | 39 | 9 |

The results confirm that the surface-treated TiO$_2$ particle can show a smaller surface energy change before and after being applied than the non-treated TiO$_2$ particle.

Preparation of Ink Composition
RK-202102-001-1-USO

An ink composition is prepared by mixing a dispersion including green light-emitting quantum dots (InZnP/ZnSeS) in the monomer or in an organic solvent such as chloroform) with a mixed solution of surface-treated titanium oxide powder and an acrylate monomer (Example 2) or a mixed solution of non-treated titanium oxide powder and an acrylate monomer (Comparative Example 2).

The mixed solution (dispersion) and the obtained ink composition are analyzed with respect to particle sizes by using a commercial particle size analyzer, and the results are shown in Table 2.

TABLE 2

| | Particle size of dispersion | | Particle size of ink composition | |
|---|---|---|---|---|
| | D50 (nm) | D90 (nm) | D50 (nm) | D90 (nm) |
| Comp. Example 2 | 160 | 187 | 195 | 211 |
| Example 2 | 149 | 161 | 151 | 203 |

The obtained ink composition is coated on a glass substrate (e.g., by using a droplet discharge device) and exposed to perform photopolymerization, obtaining a composite (a thickness of 10 um). The composite according to the example exhibits an incident light absorption rate of 80% or more and a light conversion rate (A/B, A is a dose of emitted light, B is a dose of excitation light) of 33% or more (e.g., after POB). (Incident light wavelength: about 532 nm)

While this disclosure has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. An ink composition comprising
a plurality of titanium oxide particles, a plurality of luminescent nanostructures, and a monomer comprising a carbon-carbon unsaturated bond,
wherein the plurality of titanium oxide particles has an average size of greater than or equal to about 10 nanometers and less than or equal to about 900 nanometers, comprises an organosilane compound, and have a zeta potential of greater than or equal to about 5 millivolts and less than or equal to about 70 millivolts,
wherein an amount of the organosilane compound is greater than or equal to about 0.1 weight percent and less than or equal to about 10 weight percent, based on the total weight of the titanium oxide particles,
wherein the ink composition has a total solid content of greater than equal to about 90 weight percent, based on a total weight of the ink composition, and
wherein an amount of the plurality of titanium oxide particles is greater than or equal to about 1 weight percent and less than or equal to 30 weight percent, and an amount of the plurality of luminescent nanostructures is greater than or equal to 9 weight percent and less than or equal to 80 weight percent, based on the total solid content of the ink composition, and
the ink composition is configured to emit a first light,
wherein the organosilane compound has a moiety represented by Chemical Formula 1-1:

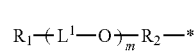

Chemical Formula 1-1 wherein, R$_1$ is hydrogen, a substituted or unsubstituted C1 to C30 alkyl group, a substituted or unsubstituted C1 to C30 alkyl ester moiety, a substituted or unsubstituted C1 to C10 alkoxy group, a hydroxy group, a carboxyl group, a (meth)acrylate group, an amine group, a maleimide group, a thiol group, an azide group, or a C1 to C10 fluorinated alkoxy group, L$^1$ is a substituted or unsubstituted C1 to C10 alkylene group, a substituted or unsubstituted C1 to C10 fluorinated alkyl group, or a combination thereof, R$_2$ is a direct bond, a substituted or unsubstituted C1 to C20 alkylene group, a sulfonyl (—SO$_2$—), a carbonyl (CO), ether (—O—), sulfide (—S—), a sulfoxide (—SO—), ester (—C(=O)O—), —NR—, —C(=O)NR—, wherein R is hydrogen or a C1 to C10 alkyl group, or a combination thereof,

* is a part linked to a Si atom of the organosilane compound, and m is 1 to 40.

2. The ink composition of claim 1, wherein the total solid content of the ink composition is greater than or equal to about 95 weight percent.

3. The ink composition of claim 1, wherein the titanium oxide particles have an average particle size of greater than or equal to about 50 nanometers and less than or equal to about 200 nanometers.

4. The ink composition of claim 1, wherein the zeta potential is greater than or equal to about 10 millivolts and less than or equal to about 45 millivolts.

5. The ink composition of claim 1, wherein the titanium oxide particles further comprise aluminum.

6. The ink composition of claim 5, wherein an amount of aluminum in the titanium oxide particles is greater than or equal to about 0.1 weight percent and less than or equal to about 10 weight percent based on the total weight of the titanium oxide.

7. The ink composition of claim 1, wherein an amount of the organosilane compound is greater than or equal to about 0.5 weight percent and less than or equal to about 10 weight percent, based on the total weight of the titanium oxide particles.

8. The ink composition of claim 1, wherein
in Chemical Formula 1-1,
$L^1$ is a substituted or unsubstituted C1 to C10 alkylene group, or a substituted or unsubstituted C1 to C10 fluorinated alkyl group.

9. An ink composition comprising:
a plurality of titanium oxide particles, a plurality of luminescent nanostructures, and a monomer comprising a carbon-carbon unsaturated bond, and optionally an organic solvent:
wherein the plurality of titanium oxide particles has an average size of greater than or equal to 10 nanometers and less than or equal to 900 nanometers, comprise an organosilane compound, and have a zeta potential of greater than or equal to about 5 millivolts and less than or equal to about 70 millivolts;
wherein the ink composition has a total solid content of greater than equal to 90 weight percent, based on a total weight of the ink composition; and
an amount of the plurality of titanium oxide particles is greater than or equal to 1 weight percent and less than or equal to 30 weight percent, and an amount of the plurality of luminescent nanostructures is greater than or equal to 9 weight percent and less than or equal to 80 weight percent, based on the total solid content of the ink composition, and
the ink composition is configured to emit a first light,
wherein the organosilane compound comprises a compound represented by Chemical Formula 1:

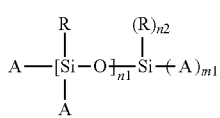

Chemical Formula 1 wherein, n1 is an integer of 0 to 10,
n2 is an integer of 1 to 3, m1 is 0 or an integer of 1 to 2, n2+m1 is 3,
each A is the same or different, and each independently a hydroxyl group, a substituted or unsubstituted C1 to C10 alkoxy group, chlorine, —O*, wherein * of —O* represents a part to be connected to a surface of the luminescent nanostructure, or a combination thereof, optionally wherein at least one A is —O*, and
each R is the same or different, and each independently a C1 to C40 substituted or unsubstituted aliphatic hydrocarbon group, a C6 to C40 substituted or unsubstituted aromatic hydrocarbon group, a C1 to C40 (or C3 to C24) substituted or unsubstituted aliphatic hydrocarbon group in which at least one methylene is replaced by sulfonyl (—SO$_2$—), carbonyl (CO), ether (—O—), sulfide (—S—), sulfoxide (—SO—), ester (—C(=O)O—), amide (—C(=O)NR—, wherein R is hydrogen or a C1 to C10 alkyl group), a moiety represented by Chemical Formula 1-1, or a combination thereof;

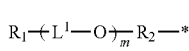

Chemical Formula 1-1 wherein, $R_1$ is hydrogen, a substituted or unsubstituted C1 to C30 alkyl group, a substituted or unsubstituted C1 to C30 alkyl ester group, a substituted or unsubstituted C1 to C10 alkoxy group, a hydroxy group, a carboxyl group, a (meth)acrylate group, an amine group, a maleimide group, a thiol group, an azide group, or a C1 to C10 fluorinated alkoxy group,
$L^1$ is a direct bond, a substituted or unsubstituted C1 to C10 alkylene group, a substituted or unsubstituted C1 to C10 fluorinated alkylene group, or a combination thereof,
$R_2$ is a direct bond, a substituted or unsubstituted C1 to C20 alkylene group, sulfonyl (—SO$_2$—), carbonyl (CO), ether (—O—), sulfide (—S—), sulfoxide (—SO—), ester (—C(=O)O—), —NR—, amide (—C(=O)NR—), or a combination thereof, wherein R is hydrogen or a C1 to C10 alkyl group,
* is a part linked to Si atom of the organosilane compound, and
m is 1 to 40, and
wherein an amount of the organosilane compound is greater than or equal to about 0.1 weight percent and less than or equal to about 10 weight percent, based on the total weight of the titanium oxide particles.

10. The ink composition of claim 1, wherein the organosilane compound has a molecular weight of greater than or equal to about 50 grams per mole and less than or equal to about 10,000 grams per mole.

11. The ink composition of claim 9, wherein the organosilane compound comprises an organosilicon compound having a polyalkylene oxide moiety.

12. The ink composition of claim 1, wherein the ink composition has a viscosity at a temperature of 25° C. of greater than or equal to about 5 centipoise and less than or equal to about 35 centipoise.

13. The ink composition of claim 1, wherein the ink composition does not include a carboxylic acid group-containing binder polymer having an acid value of greater than or equal to about 50 milligrams of KOH per gram, or a polythiol compound having two or more thiol groups.

14. The ink composition of claim 1, wherein the ink composition has a vapor pressure at 20° C. of less than or equal to about 1 mmHg.

15. The ink composition of claim 1, wherein the ink composition has an average particle size of less than or equal to about 2 micrometers, as confirmed by dynamic light scattering (DLS) analysis.

16. The ink composition of claim 1, wherein
the luminescent nanostructures comprise a Group II-VI compound, a Group III-V compound, a Group IV-VI compound, a Group IV element or compound, a Group II-III-VI compound, a Group I-II-IV-VI compound, or a combination thereof, and
the luminescent nanostructures do not contain cadmium.

17. The ink composition of claim 1, wherein the luminescent nanostructures comprise a semiconductor nanocrystal core comprising indium, zinc, or a combination thereof, and a semiconductor nanocrystal shell disposed on the core and having a different composition from the core.

18. The ink composition of claim 1, wherein the luminescent nanostructures comprise an organic ligand on their surface, and the organic ligand is RCOOH, RNH$_2$, R$_2$NH, R$_3$N, RSH, R$_3$PO, R$_3$P, ROH, RCOOR, RPO(OH)$_2$, RHPOOH, RHPOOH, R$_2$POOH, or a combination thereof, wherein each R is independently a substituted or unsubstituted C1 to C40 aliphatic hydrocarbon group, a substituted or unsubstituted C3 to C40 aromatic hydrocarbon group, or a combination thereof.

19. A method for producing a pattern comprising a luminescent nanostructure composite, comprising depositing the ink composition of claim 1 on a substrate through a droplet discharging device to form a patterned film; and polymerizing the monomer.

20. The method of claim 19, the method excluding a step of removing a volatile organic material.

21. The ink composition of claim 9, wherein the ink composition does not include a carboxylic acid group-containing binder polymer having an acid value of greater than or equal to about 50 milligrams of KOH per gram, or a polythiol compound having two or more thiol groups.

22. The ink composition of claim 1, wherein an amount of the plurality of luminescent nanostructures is greater than or equal to 15 weight percent and less than or equal to 51 weight percent, based on the total solid content of the ink composition.

* * * * *